Oct. 8, 1963

C. R. WILLIAMS ETAL 3,106,635

INTERCOUPLING APPARATUS

Filed Dec. 11, 1959

Charles R. Williams
Guy E. Morrison
Willis Leach
Walter J. Reely

By Smyth & Roston
Attorneys

Oct. 8, 1963

C. R. WILLIAMS ETAL 3,106,635

INTERCOUPLING APPARATUS

Filed Dec. 11, 1959

INVENTORS:
Charles R. Williams
Guy E. Morrison
Willis Leach
Walter J. Reely

By Smyth & Roston
Attorneys,

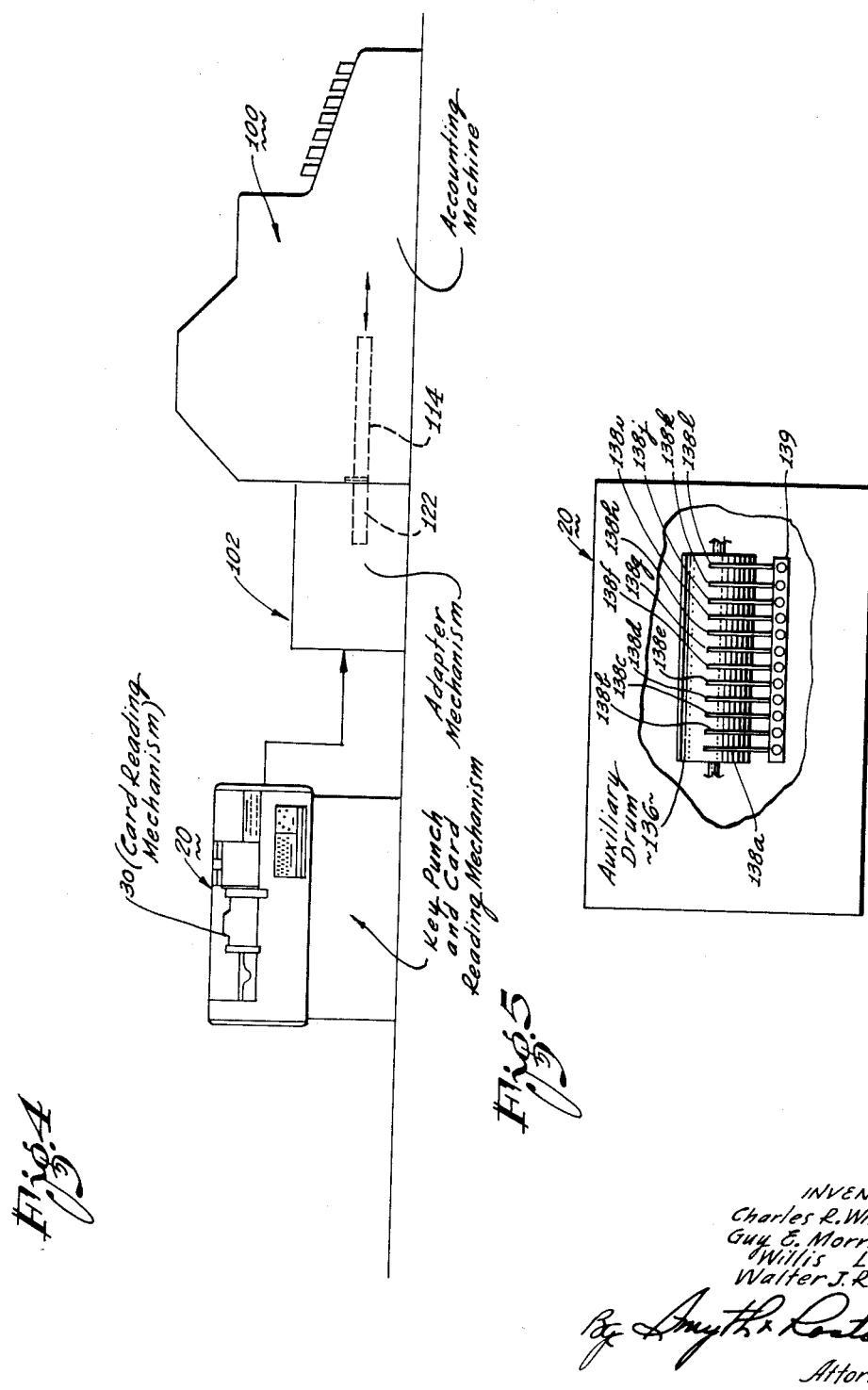

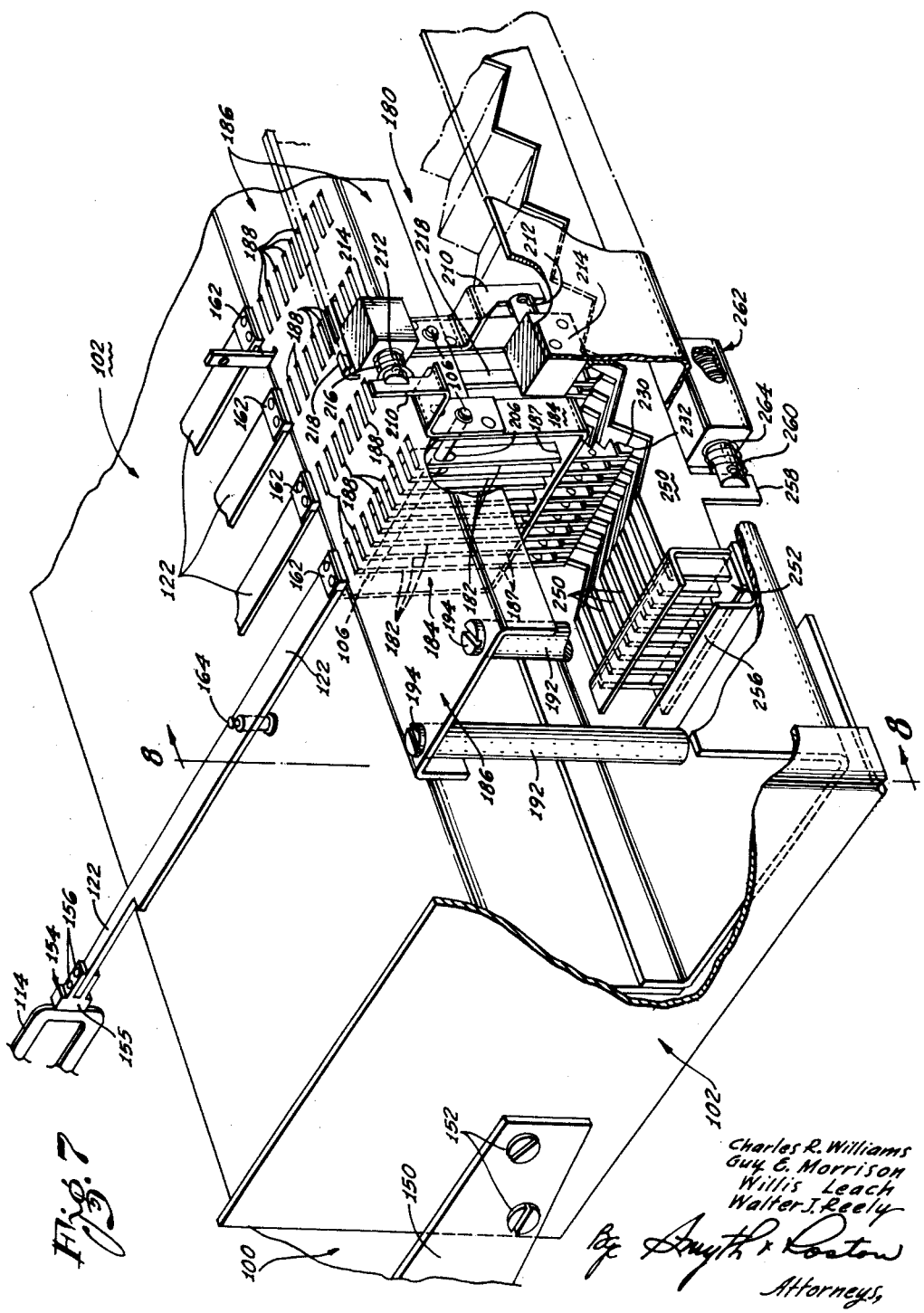

Oct. 8, 1963  C. R. WILLIAMS ETAL  3,106,635
INTERCOUPLING APPARATUS
Filed Dec. 11, 1959  9 Sheets-Sheet 5

INVENTORS:
Charles R. Williams
Guy E. Morrison
Willis Leach
Walter J. Reely
By Smyth & Roston
Attorneys Oct. 8, 1963   C. R. WILLIAMS ETAL   3,106,635
INTERCOUPLING APPARATUS
Filed Dec. 11, 1959   9 Sheets-Sheet 7

INVENTORS:
Charles R. Williams
Guy E. Morrison
Willis Leach
Walter J. Reely

By Smyth & Roston
Attorneys

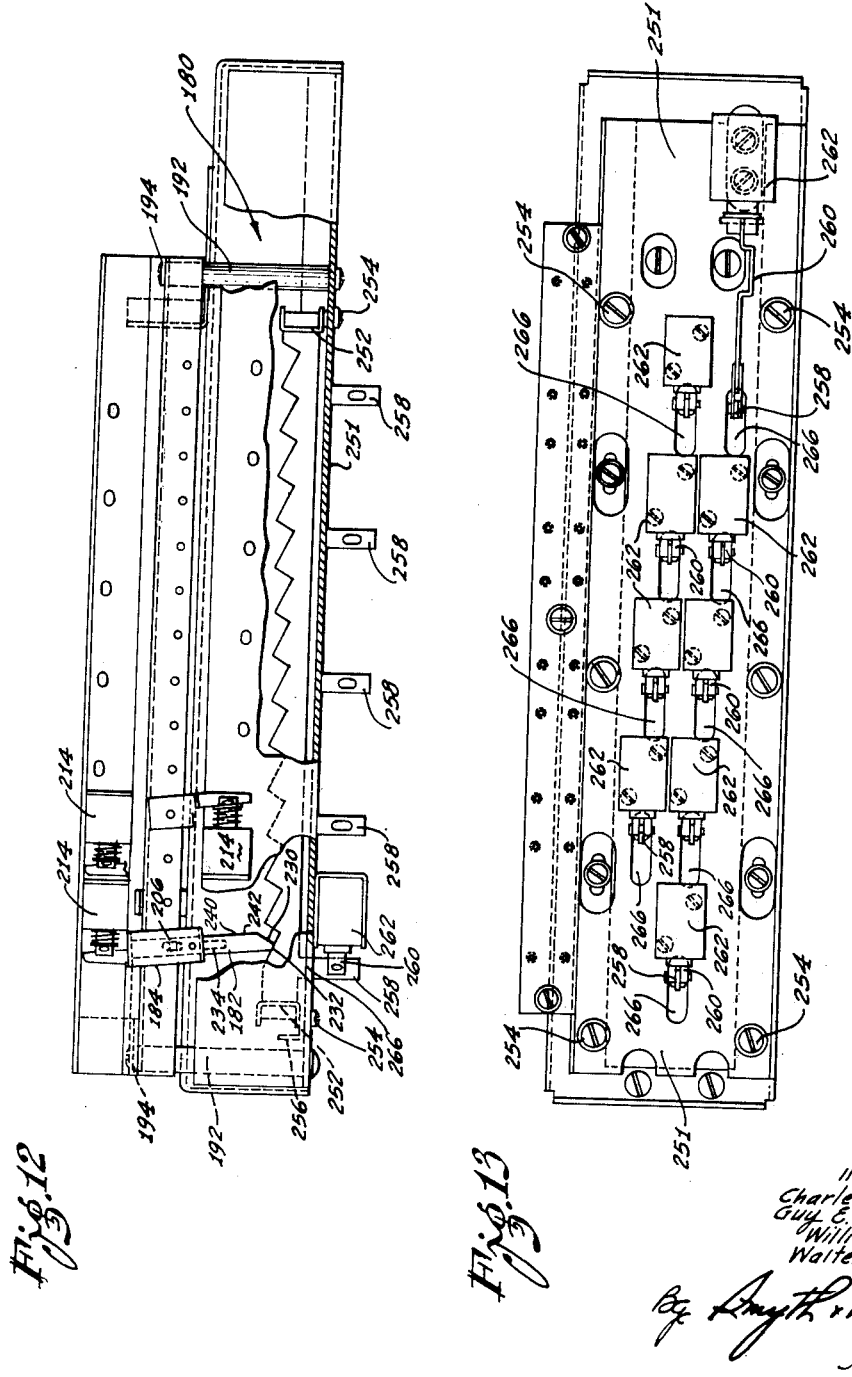

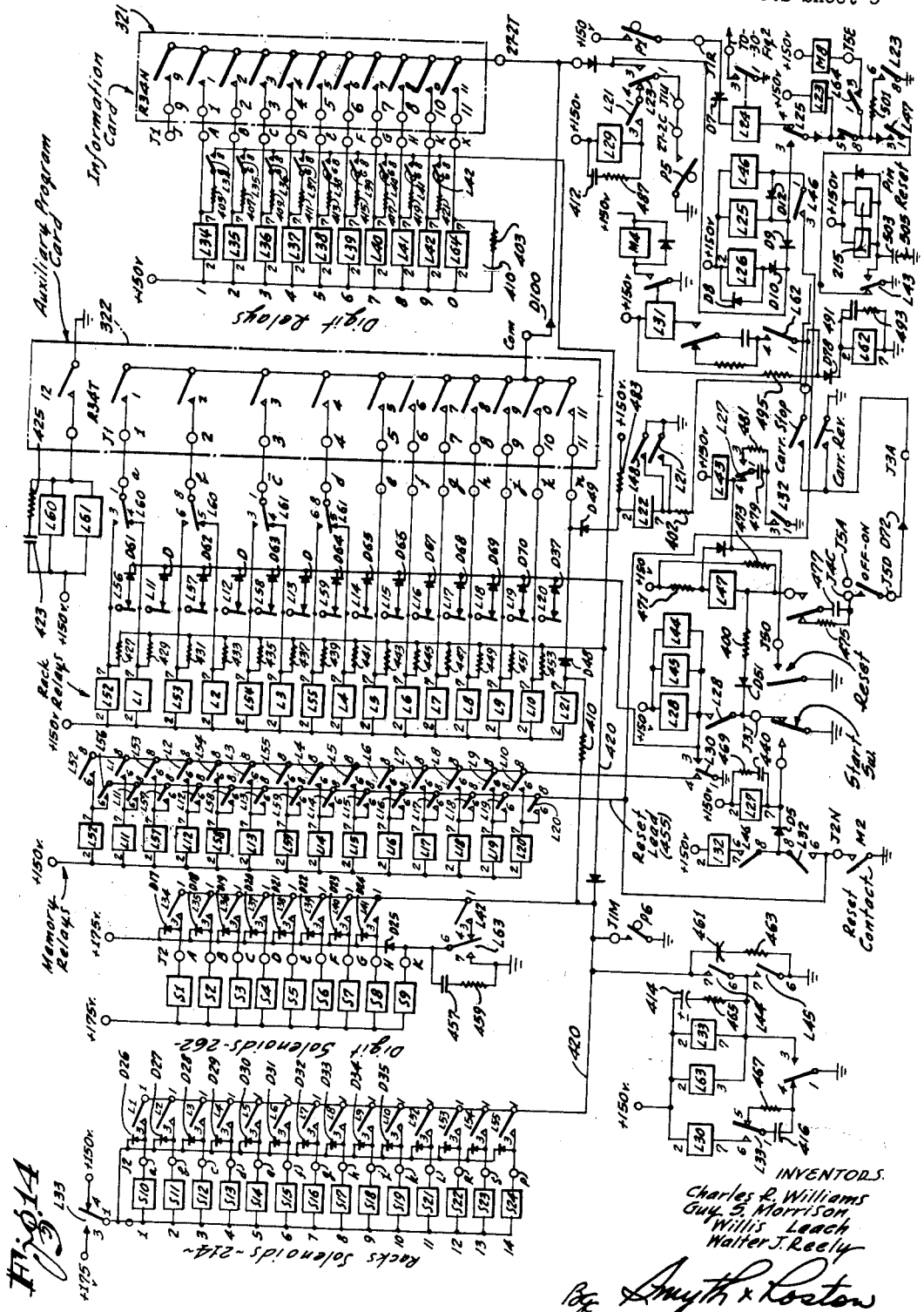

United States Patent Office 3,106,635
Patented Oct. 8, 1963

3,106,635
INTERCOUPLING APPARATUS
Charles R. Williams, Palos Verdes, Guy E. Morrison, Rolling Hills, Willis Leach, Hermosa Beach, and Walter J. Reely, Manhattan Beach, Calif., assignors, by mesne assignments, to General Instrument Corporation, Hawthorne, Calif., a corporation of New Jersey
Filed Dec. 11, 1959, Ser. No. 858,939
34 Claims. (Cl. 235—61.6)

The present invention relates to apparatus and systems in which one instrumentality is inter-coupled with another. The invention is more particularly concerned with improved apparatus and systems in which sensing means such as a key punch is coupled to an accounting machine to control the operation of the accounting machine in accordance with signals produced by the key punch from cards disposed in the key punch.

In one embodiment of the invention, a sensing mechanism such as a key punch reads punched coded recordings on successive columns of cards which are sequentially fed to the mechanism. The key punch is coupled to an accumulator type of accounting machine which operates to perform arithmetic computations on the information introduced to the accounting machine. This coupling is achieved by means of a coupling unit which permits the key punch and reading mechanism to control the operation of the accumulator. The control is such that numerical data from different fields of each of the punched information storage cards may be entered in separate columns in the accumulator and totalized in the accumulator when desired.

The punched type of information storage card referred to above is used in many types of data processing systems. These punched cards are usually divided into a series of "fields" which can be altered by changing the composition of a program control card, as is well known. Each of the "fields" of the information storage card includes a predetermined number of adjacent columns, and this number may vary from field to field. Each of the columns represents a different punching or reading position of each card, as that card is shifted with intermittent motion through the key punch mechanism.

Each of the columns referred to in the proceding paragraph may represent, for example, a series of digit levels extending from 0 to 9, inclusive. The location of a hole in any particular column represents a digit of from 0 to 9, inclusive, depending upon the digit level in the column at which the particular hole is located. Adjacent columns in each field may represent digits of varying ordinal significance. In this manner, a multi-digit number may be represented in each field by the pattern of punchings from one column to the next in that field.

The information storage cards referred to above are capable of storing information for a wide range of different uses. For example, the information stores on such cards may represent inventories maintained in various departments, stores and warehouses of a large and complex business organization. Moreover, the information stored on the cards may represent census figures, and countless other types of information.

Instrumentalities are presently known which are capable of sensing, or reading, the hole patterns on successive ones of the information storage cards, and of transforming the hole patterns into equivalent output signals. The output signals derived from the card reader correspond to the digits represented by the hole pattern, as each card is read on a position-by-position, column-by-column, basis. A combined key punch and card reader mechanism, suitable for the purpose described above, is illustrated and described, for example, in United States Patent 2,684,719 which issued July 27, 1954 in the name of R. B. Johnson et al.

However, the need often arises for accumulating and totalizing the numerical information on successive ones of the information storage cards, as such cards are read by a card reading mechanism in the manner referred to in the preceding paragraph. An important feature of the present invention is the provision of an improved system in which a card reading mechanism is coupled to an appropriate accounting machine for that purpose. The result of such inter-coupling is an improved assembly which is capable of reading information in any selected field, or fields, on each of a plurality of information storage cards and which is capable of accumulating the information in the accounting machine so read so that appropriate totals may be provided.

A suitable accounting machine for providing the desired accumulating and totalizing, is described and illustrated in United States Patent 2,626,749 which issued January 27, 1953 in the name of R. A. Christian et al. The particular machine described in that patent is of the accumulator type and is capable of many different operations, including receiving information from each of the different fields of each of the cards being processed, and of simultaneously providing a separate total for each group of fields.

The present invention in one of its aspects, therefore, provides an improved inter-coupled mechanism and system which includes a card sensing mechanism of the type described in the above-mentioned Patent 2,684,719 and a posting machine of the type described in the above-mentioned Patent 2,626,749. The invention also includes apparatus inter-coupling the sensing mechanism and the posting machine to control the operation of the posting machine in accordance with information read by the sensing mechanism from information cards such as punched cards. The net result of such an inter-coupling is to enable the posting machine to maintain a running record of numerical data read from each field of successive ones of the cards by the card sensing mechanism, for convenient and rapid totalizing of the data in each series of fields.

The posting machine described and illustrated in the United States Patent 2,626,749 includes a plurality of actuator racks which move in a rectilinear manner along parallel paths. Each of these racks represents a different ordinal level of each number to be entered into the machine. Each of the actuator racks is normally caused to be moved by the keyboard to a position corresponding to a particular digit at the ordinal level that the particular rack represents. Each of the racks may be so moved, for example, to different positions in a range representing values between "0" and "9." In the system of the present invention, the keys of the keyboard of the accounting machine are set so that each of the actuator racks tends to move along its path to its position representing a maximum value of "9." However, certain pin members are automatically controlled, as will be described, to arrest the movement of the different racks at positions representative of the different digits of a multi-digit number to be transferred from an information storage card to the accounting machine. The particular accounting machine referred to above includes a movable carriage which is controllable to permit a plurality of columns of figures, corresponding, for example, to a corresponding plurality of fields on each of the processed information storage cards, to be entered into the accounting machine for simultaneous totalizing.

In the embodiment of the invention to be described, a corresponding plurality of extension arms are mechanically coupled to respective ones of the actuator racks of the calculating machine. These extension arms extend, for example, in spaced parallel relationship through the rear wall of the calculating machine, and they are supported for reciprocal rectilinear movement along parallel paths. The coupling assembly of the invention includes, in the embodiment to be described, a unit which may conveniently be attached to the back of the calculating machine without disturbing the internal operating components of the machine to any appreciable extent. The unit to be described includes a plurality of stop pin members which are positioned to controllably engage respective ones of the extension members. The stop pin members in turn are controlled by corresponding ones of a plurality of solenoids in the coupling unit. The latter control is such, that when certain ones of the solenoids are energized, the corresponding stop pin members arrest the respective extension arms, and hence the respective actuator racks, at predetermined digit positions.

The solenoids referred to above in the coupling unit are energized by signals derived from the card reading mechanism as it senses successive ones of the information storage cards fed through it. In this manner, as each information card is sensed by the card reading mechanism, signals corresponding to the information recorded in each field of the card are introduced to the coupling unit to energize the different solenoids in the coupling unit. This energizing of the solenoids is such that the actuator racks are first caused to assume positions corresponding to the number represented by the signals from the card reading mechanism corresponding to the first field of the cards being processed. The number so represented is then stored in the accounting machine, and the actuator racks are returned to their "0" positions.

The carriage of the machine is now shifted to enable the machine to receive the number recorded in the next field of the card being processed by the card reader. These operations are repeated until the information from all the fields of the card have been entered into the accounting machine. The procedure is then repeated for the next card, and this continues until a predetermined number of cards have been processed by the card reading mechanism and the information from the cards has been entered into the posting machine. Then, the posting machine is actuated to perform a totalizing function on the numbers stored in it from the different fields of the cards successively processed by the card reading mechanism.

The improved assembly of the invention is advantageous in that it is compact and relatively inexpensive. Moreover, the assembly can be conveniently attached to existing accounting machines and to existing card reading mechanisms in a relatively simple and straightforward manner and without disturbing the internal components of the existing machines to any material extent.

In the drawings:

FIGURE 1 is a fragmentary representation of a typical punched-type information storage card that may be utilized in the mechanism of the apparatus, the illustrated card having punches located at different digit positions in adjacent columns in each of a plurality of fields to represent numerical data stored on the card;

FIGURE 2 is a top plan view of a typical combined key punch and reading mechanism for punched cards such as the information storage card of FIGURE 1, the representation of the mechanism being somewhat schematic in form and illustrating different components of the mechanism whereby cards may be punched in accordance with information to be recorded on them, and subsequently sensed, or read, so that the information recorded on the cards may be read and converted into electrical signals;

FIGURE 3 is a perspective view of a typical accounting machine suitable for use in the system of the invention, and this view also shows an adapter unit which incorporates the concepts of the present invention and which is mounted on the rear wall of the illustrated accounting machine, the adapter unit being illustrated as being mechanically coupled to certain of the internal components of the accounting machine;

FIGURE 4 is a schematic representation of the apparatus and system of the invention in which the key punch and card reading mechanism of FIGURE 2 is coupled through the adapter unit to the accounting machine of FIGURE 3 so that data stored on successive information storage cards sensed by the card reader mechanism may be entered into and totalized by the accounting machine;

FIGURE 5 is a fragmentary view of one of the internal components of the key punch and card reading mechanism of FIGURE 2, the illustrated component including an auxiliary drum and certain switches associated with the drum, the resulting assembly being used for control and timing purposes, as will be described;

FIGURE 7 is a fragmentary perspective view, partly in section, of the adapter unit of FIGURE 5, the latter view illustrating the mounting of a plurality of stop pin members, and the actuating means for the stop members for positioning the same to selectively control the relative positions of a plurality of actuator racks in the accounting machine of FIGURE 3;

FIGURE 12 is a sectional side view of the adapter unit of the invention; and this view reveals a digit actuator rack and appropriate solenoid controls for the rack, and also the manner in which a stop member is controlled to be selectively actuated by the rack;

FIGURE 13 is a bottom view of the adapter unit to illustrate the manner in which a plurality of rack actuator relays are mounted on the units; and FIGURE 14 is a circuit diagram of an appropriate control system for use in controlling the operation of the system and apparatus of the invention.

Figure 1:
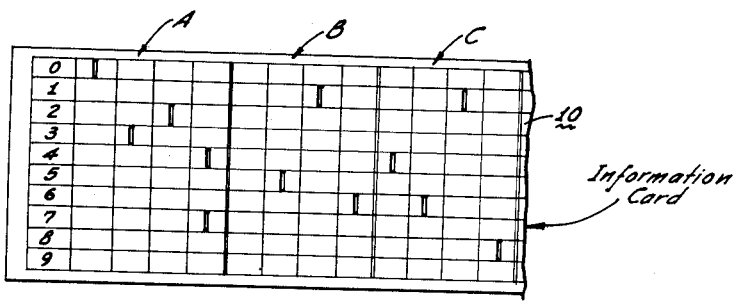

A typical information storage card which may be used in practicing the invention is shown in fragmentary form, and is designated as 10, in FIGURE 1. As illustrated in FIGURE 1, the information storage card 10 may be divided into a plurality of adjacent fields, such as the illustrated fields A, B and C. Each of the fields, in turn, may be divided into a number of columns, and the number of columns may vary from field to field, as mentioned above. The columns represent digit positions between "0" and "9," inclusive, and the ordinal level location of a hole in any column of a field is representative of a corresponding digit. As mentioned above, the columns in any particular field may represent digits of different significance, and multi-digit numbers may be represented by the different holes in the columns in the different fields.

The information storage card of FIGURE 1, and others like it, may be punched and subsequently sensed by the key punch and card reading mechanism shown in plan view in FIGURE 2. As noted, this mechanism may be similar to the apparatus described in Patent 2,684,719. For that reason, a detailed description of the mechanism will not be included in the present specification. However, the mechanism will be described in sufficient detail to provide a clear understanding as to how it may be coupled into the assembly of the invention.

Figure 2:
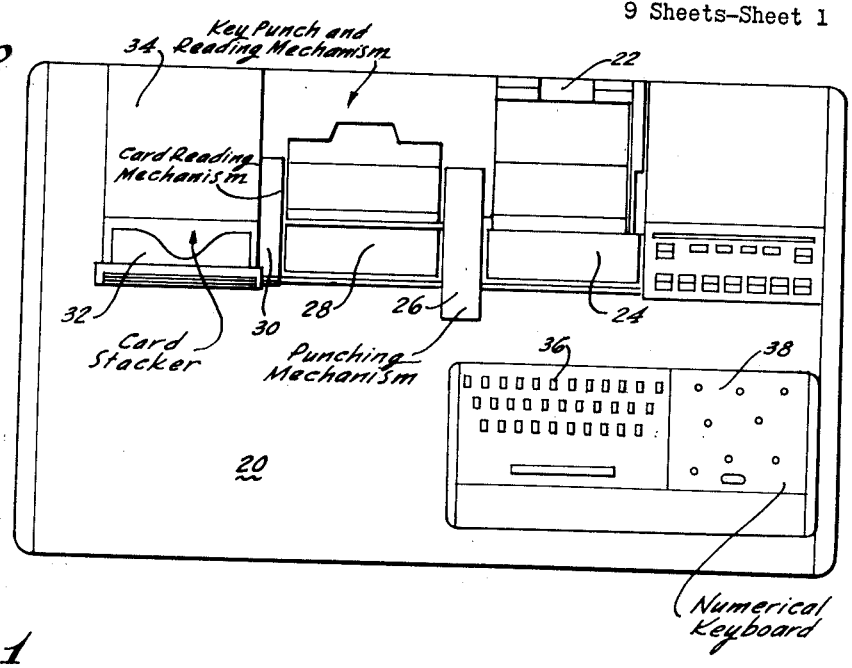

The key punch and card reading mechanism of FIGURE 2 is represented generally as 20. Blank information storage cards, similar to the card 10 of FIGURE 1, are fed into a hopper 22 in the mechanism of FIGURE 2. The blank cards from the card hopper 22 are then fed in succession to a carriage 24 upon the operation of the machine. The cards in the carriage 24 are carried in a direction towards the left in FIGURE 2 through a card punching mechanism indicated generally as 26. The information storage cards are moved in a step-by-step manner through the mechanism of FIGURE 2 under the control of an auxiliary program card, and under the control of appropriate keyboards, (such as the keyboards 36 and 38) so that each column of each information storage card to be processed may be punched in the punching mechanism 26 at a location in each column corresponding to the digit to be recorded in that particular column.

After each information storage card has passed through the punching mechanism 26, it is moved onto a carriage 28. The carriage 28 then carries the punched cards in succession through a card reading mechanism 30 and deposits the cards in succession into a card stacker 32. The card stacker 32 serves to stack the cards into an appropriate holder 34. The cards stacked in the holder 34, therefore, are all punched in accordance with the information to be recorded on the different cards. As mentioned above, the punching may be controlled, for example, by the manual manipulation of the alphabetic keyboard 36 and by the manual manipulation of the numerical keyboard 38.

The card reading mechanism 30 provides electrical output signals representative of the punched positions in the successive columns of each field of the information cards passed through it. These output signals are used, in accordance with the invention, to control the operation of an accounting machine. As noted above, this control is such that the data recorded in each of the fields of successive cards processed by the card reading mechanism 30 can be totalized. The cards may be circulated through the card reading mechanism 30 directly from the punching mechanism 26, as described above; or a sequence of cards which have previously been punched can be fed through the card reading mechanism so that the data in each of the fields of the information storage cards may be totalized by the system of the invention.

As mentioned above, the control system of the present invention may be used in conjunction with a complex type of accounting machine, such as the machine described in Patent 2,626,749. The particular machine described in that patent is illustrated at 100 in perspective in FIGURE 3, and an adapter unit 102 constructed in accordance with the present invention is mounted on the rear wall of the accounting or calculating machine 100. This adapter unit, in a manner to be described, controls the accounting machine so that the numerical information read by the card reading mechanism 30 of FIGURE 3 from the fields of a plurality of information storage cards may be stored in the accounting machine for totalizing purposes.

Figure 3:
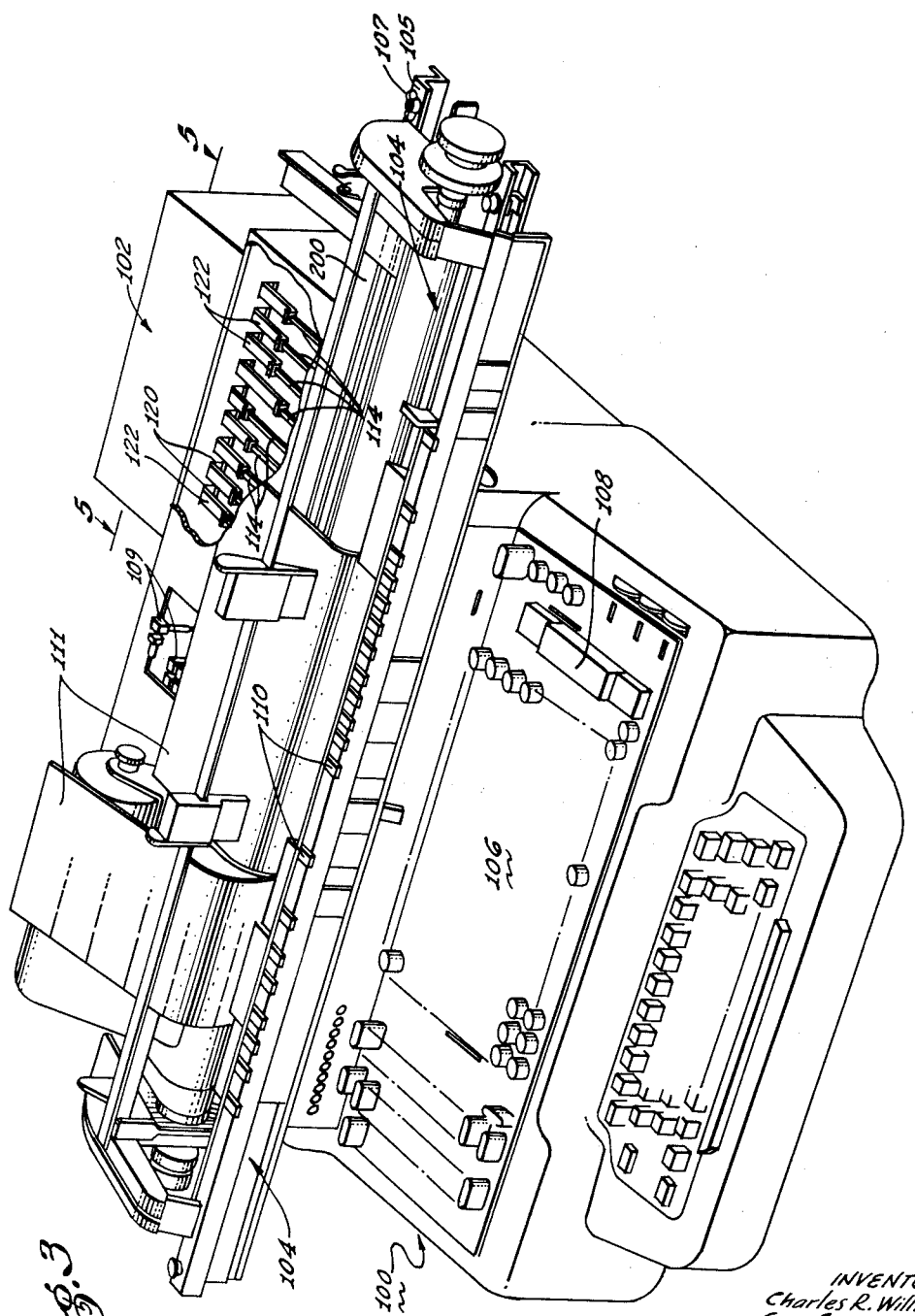

The accounting machine 100 of FIGURE 3 in this application corresponds in its showing to FIGURE 1 of Christian Patent 2,626,749. The accounting machine 100 shown in FIGURE 3 includes a movable carriage 104 which is adapted to be laterally displaced as each field of information from the storage card is entered into the machine. A bar 105 is fastened to the rear of the carriage 104 by a plurality of bolt and wing-nut assemblies, such as the assembly 107. This bar, in the manner described in copending application Serial No. 674,766, filed July 29, 1957, supports a plurality of switch actuators which engage switches such as the switches 109, as the carriage moves. The switch actuators are positioned to enable the carriage to move from one field position to the next upon the completion of the entering into the accounting machine of the information from any particular field of the card being processed.

No attempt will be made to describe the normal operation of the accounting machine 100, as such operation is described in the Patent 2,626,749 and is well known to the art. The illustrated machine 100, in common with most accounting machines, is capable of printing a plurality of columns of numbers on recording papers 111 and of simultaneously totalizing the numbers in all the columns. The numbers are normally set up by a somewhat complex keyboard 106 and various operating controls well known to the accounting machine art are mounted adjacent the keyboard. One of these controls, for example, includes a usual "motor bar" 108. The actuation of this motor bar causes the multi-digit number represented by the relative positions of a plurality of actuator racks 114 to be entered into the accumulator register of the machine and printed on the recording paper 111. Such actuations also cause the actuator racks to be retracted to a reference position and the carriage 104 to become laterally displaced so as to condition the machine to accept the number from the next field of the information storage card being processed. The motor bar 108 is normally manually actuated. However, in the system of the invention, a solenoid is coupled to the motor bar to enable it to be electrically actuated.

The carriage 104 includes a series of additional stops 110 which are manually adjustable to different positions and which mechanically control the movement of the carriage 104 as it is actuated from one field to the next of each card processed by the system of the invention. The stops 110 are fully shown in FIGURES 4 and 95 of Christian Patent 2,626,749 and are disclosed in column 62 of that patent.

The machine 100, in common with other accounting machines, includes a mechanical memory unit in which the digits of each number are stored as the numbers are being set up by the manual control of the keyboard 106. The numbers are so stored in a plurality of spaced parallel actuator racks, such as the racks 114 referred to above. These actuator racks, in the illustrated embodiment, are horizontal, and they are reciprocally moved back and forth in a rectilinear direction along parallel paths to assume different horizontal positions corresponding to the various digits which form the number set up at any particular time in the machine.

The adapter unit 102 is supported by a pair of brackets 150 (FIGURE 7) on the rear wall of the accounting machine 100. A series of holes 120 are formed in the rear wall of the accounting machine in respective axial alignment with the actuator racks 114 of the machine.

A plurality of spaced parallel horizontal movable elongated control members 122 are slidably mounted in the unit 102. These movable members are in respective axial alignment with the actuator racks 114 of the accounting machine, when the adapter 102 is mounted in place on the rear wall of the machine. The elongated members 122 serve as extension members, and they extend into the accounting machine through corresponding ones of the holes 120. Each of the members 122 is coupled to an end of a corresponding actuator rack 114, as will be described in more detail subsequently.

The schematic representation of FIGURE 4 shows the key punch and card reading mechanism 20 of FIGURE 2 electrically coupled to the adapter unit 102 described briefly in FIGURE 3. The adapter unit 102, in turn, includes the plurality of extension control members 122 described above, and these control members are coupled to respective ones of the actuator racks 114 of the accounting machine 100. As mentioned above and as will be described in detail, the unit 102 responds to signals from the card reading mechanism 30 of the key punch and card reading unit 20 to control the position of respective ones of the actuator racks 114 in the accounting machine 100. This, in turn, permits numbers to be successively accumulated in the accounting machine 100 which correspond to numerical information read from successive information storage cards processed by the card reading mechanism 20.

An auxiliary drum 136 (FIGURE 5) is included in the key punch and card reading mechanism 20. The auxiliary drum 136 is driven in synchronism with the movement of each card through the card reading mechanism 30. The auxiliary program card 137 of FIGURE 5. The auxiliary program card is, therefore, rotated on the drum 136 in synchronism with the movements of each information storage card through the key punch and card reading mechanism 20.

The use of an information card and an auxiliary card is discussed in columns 35 to 38, inclusive, of Johnson Patent 2,684,719 and in columns 6 to 12, inclusive, of the Johnson patent. The auxiliary program card corresponds to the card P in FIGURE 41 of Johnson Patent 2,684,719. FIGURE 41 also illustrates the information card providing the transfer of information to the accounting machine.

Figure 6:
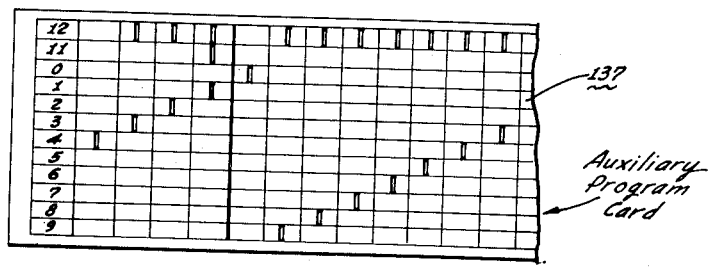
FIGURE 6 is a fragmentary view of an auxiliary program card which is adapted to be mounted on the auxiliary drum of FIGURE 5, the auxiliary program card having punches at different locations and which are positioned to be sensed by the armatures of the various switches in FIGURE 5 to selectively actuate the switches.

A series of aligned star wheel switches 138a, 138b, 138c . . . 138l are mounted on a block 139 in spaced parallel relationship. These star wheel switches are adapted to ride adjacent one another on the surface of the auxiliary program card 137 on the drum 136. The arrangement is such that each of the star wheel switches rides along the surface of the auxiliary program card 137 on the drum 136, with each switch having a rotatable star wheel portion engaging a different track on that surface. For example, one star wheel engages the track corresponding to the numerical value "1," and a second star wheel engages the track corresponding to the numerical value "2." These tracks each have individual holes at selected intervals (as shown in FIGURE 6) which cause the associated star wheel to drop and close its switch. By way of illustration, the star wheel engaging the track indicative of the value "1" drops and closes its switch when a hole occurs in that track. This provides, therefore, a switching system in which individual ones of a bank of switches may be selectively closed and opened in synchronism with the movement of each information storage card through the card reading mechanism 30. Such switches are described in greater detail, for example, in the copending application Serial No. 674,766 referred to above. The star wheel arrangement in the key punch is set forth in detail in columns 15 to 24, inclusive, of the specification in Johnson Patent 2,684,719 and particularly in columns 21, 22 and 23 of the Johnson specification.

The auxiliary program card is similar in its format to the information storage cards described in conjunction with FIGURE 1. As shown in FIGURE 6, the auxiliary program card 137 is divided into a plurality of adjacent columns, and each column is divided into ordinal levels to represent digits extending from 0 to 12 inclusive. The star wheel switches 138a, 138b, 138c, etc. are positioned to correspond respectively to the different ordinal levels of the different columns. Whenever a hole is made in the auxiliary card at a particular ordinal level, or digit position, in any column; the corresponding star wheel will drop when it engages that hole so that its associated switch will close. That is, the star wheel switch corresponding to the digit represented by a particular hole in a column on the control card will close when that particular column is brought into position.

The auxiliary program card 137 is so positioned on the auxiliary drum 136 that it is in step, column by column with the information card being processed by the card reading mechanism 30. That is, when the first column of the auxiliary program card 137 is drawn past the star wheels, the particular information storage card is brought into position. Then, when the auxiliary program card 137 is turned by the drum 136 to bring its second vertical column under the star wheels, the card 10 is moved to its first position in the card reading mechanism 30 so that it may be sensed. This operation then continues from column to column and from field to field of the card being processed.

Figure 9:
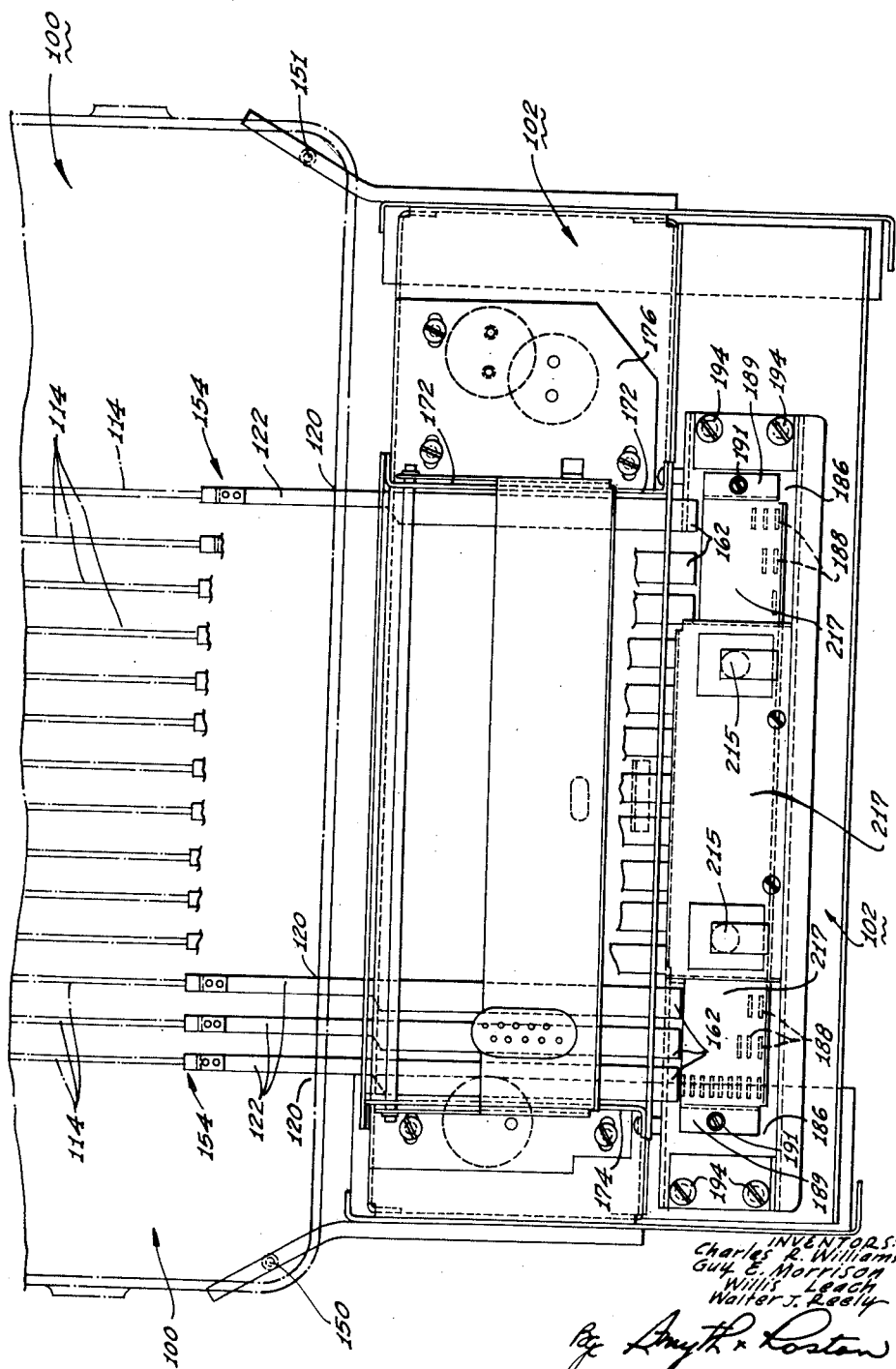
FIGURE 9 is a fragmentary top plan view, partially in section, this latter view illustrating in particular the plurality of extension members which are coupled to corresponding ones of the actuator racks.

As illustrated in FIGURES 7 and 9, the adapter unit 102 is secured to the rear wall of the accounting machine 100 by a pair of suitable brackets, such as the brackets 150 and 151. The brackets 150 and 151 are secured to the adapter unit 102 by means of screws 152. As described above, the accounting machine 100 includes a plurality of actuator racks 114, one for each digit position in the multi-digit numbers to be successively entered into the accounting machine. The adapter unit 102 includes a corresponding number of extension members 122 (FIGURE 3) which are axially aligned with respective ones of the actuator racks 114 and which are coupled to respective ones of the actuator racks, as will be described. As mentioned above, the actuator racks and extension arms move in a reciprocal manner along parallel rectilinear paths.

Figure 8:
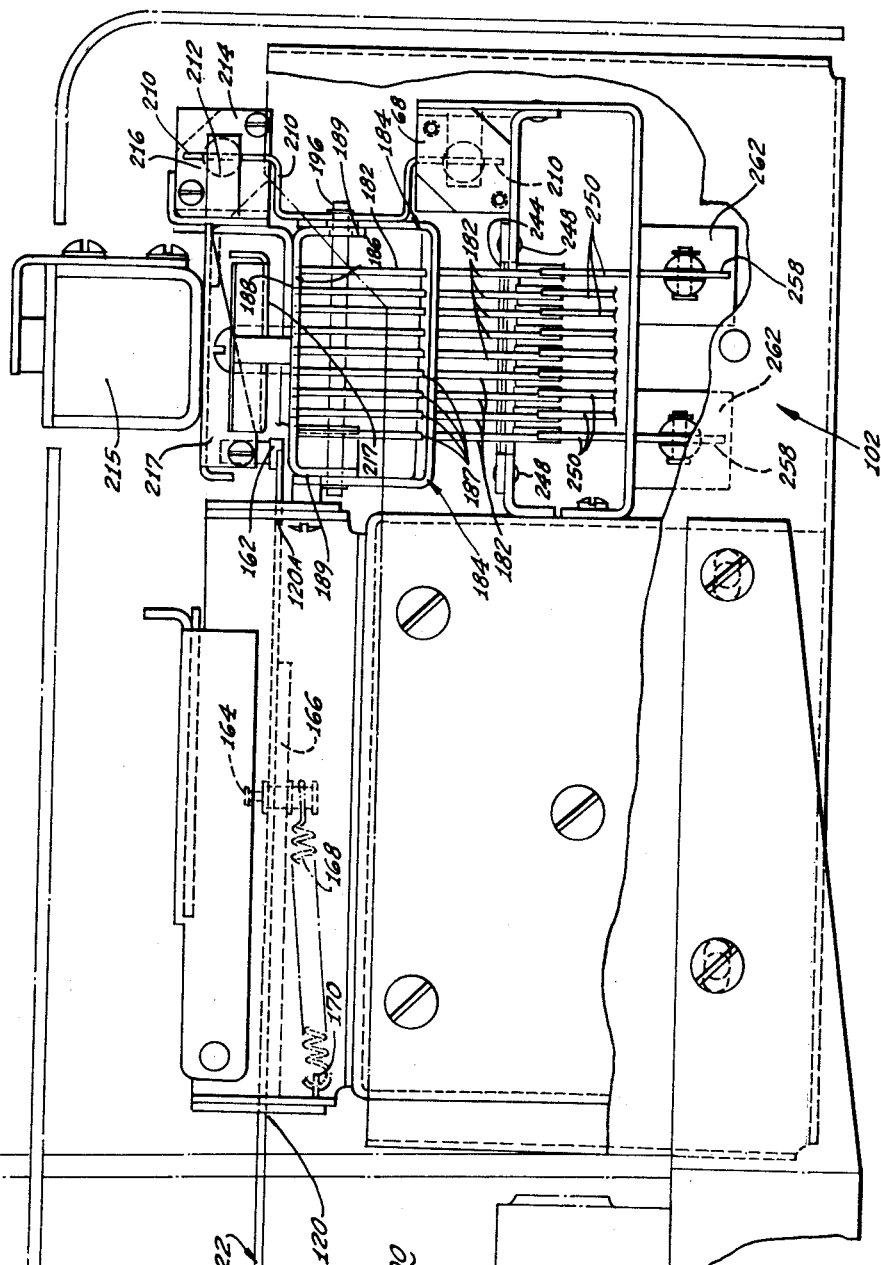
FIGURE 8 is a sectional view, substantially on the line 8—8 of FIGURE 7, and particularly illustrating the manner in which groups of the stop members are mounted in pivotable yokes, and how these stop-members are mounted to be selectively actuated into a position in the path of an extension member coupled to a corresponding actuator rack in the accounting machine.

The extension members 122, as described in conjunction with FIGURE 3, extend through corresponding holes 120 in the rear wall of the accounting machine 100. Each of the extension members bears against the end of a corresponding rack by a suitable coupling 154. Such a coupling is illustrated in FIGURES 7 and 8, for example, as including a U-shaped member 155 which may be welded or soldered to the end of a corresponding actuator rack 114 and which extends over the extremity of a corresponding extension member 122. The member 154 is attached to the end of the corresponding extension member 122 by screws 156.

As is well understood by those acquainted with the accounting machine art, and as shown in various figures including FIGURE 3A of Patent 2,626,749 and as described in columns 25 and 26 of that patent, each actuator rack normally is moved linearly to a desired digit position between a position representing "0" at one end of the range of movement and a position representing "9" at the other end of the range of movement. The actuator racks are caused to assume their different digit positions within the range as selected ones of their corresponding keyboard keys 106 in FIGURE 3 are actuated. In the illustrated embodiment, for the position representing "0," the actuator racks are in their extreme positions to the left in FIGURE 7. Conversely, for the position representing "9," each of the actuator racks 114 assumes its extreme position to the right in FIGURE 7. When all the actuator racks 114 have assumed digit positions set by their corresponding keys on the keyboard of the accounting machine during normal operation of the machine, the actuation of the motor bar 108 (FIGURE 3) of the machine causes a printing mechanism to respond to the positions of the actuator racks to print the corresponding number represented by the racks on the recording paper as mentioned above. This actuation of the motor bar 108 also causes a transfer mechanism to transfer that number to an accumulator register in the machine for totalizing purposes as also mentioned above. The actuator racks 114 are then returned to their reference positions to the left in FIGURE 7 in readiness for the next number. The actuator racks 114 in FIG- URE 7 of this application correspond to the racks 617 in FIGURE 3a of Christian Patent 2,626,749. The motor bar 108 in this application corresponds to the "main" key shown in FIGURES 1 and 2 of the Christian Patent 2,626,749.

As illustrated in particular in FIGURES 7, 8 and 9, the extremity of each of the extension members 122 is provided with a striking element 162 which is composed of a suitable resilient substance. These striking elements prevent damage to the extension members 122 as the ends of these members move against various stop pin members, as will be described.

A plurality of springs, such as the spring 168 (FIGURE 8) are coupled to respective ones of a plurality of elements 164 and to suitable brackets, such as the bracket 170 (FIGURE 8) on the rear wall of the accounting machine 100. These springs serve to bias the ends of the extension members 122 against the ends of the corresponding ones of the actuator racks 114, and they also serve as electrical conductors.

The adapter 102 includes a rack and digit selector mechanism which includes a plurality of vertical strip-like stop pin members 182 (see particularly FIGURE 7). The stop members 182 are divided into groups, and each group is disposed to the rear of a corresponding extension member 122, and under the path of the corresponding extension member. The stop members 182 of each group are positioned in parallel relationship and are each spaced apart along the path of the corresponding extension arm 122 a distance corresponding to the distance of the associated actuator rack 114 normally moves from one digit position to another.

Figure 10:
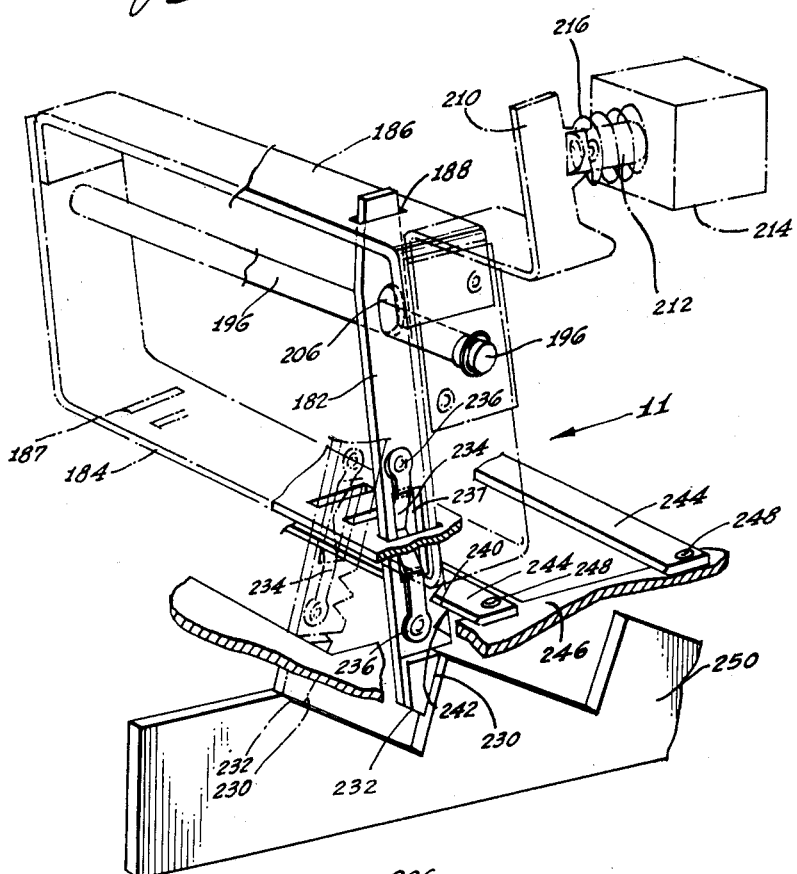
FIGURE 10 is a fragmentary perspective view of a pivotable yoke for supporting a group of stop members, and this view illustrating the mechanical and electrical components which are used to pivot the yoke and thereby clear the stop members, and for selectively actuating the stop members to respective operative positions.

The strip-like stop members 182 of each group are carried in a corresponding U-shaped member which forms a yoke 184 (see particularly FIGURE 10). A series of slots 187 are formed in the lower cross arm of the yoke 184. These slots receive the stop members 182 of the corresponding group, and they cause the stop members of that group to be supported for reciprocal slidable motion with the desired spacing between them.

A guide plate 186 is positioned immediately below the paths of travel of the extension members 122 (see particularly FIGURE 7). The guide plate 186 includes a plurality of slots 188 which are aligned with respective ones of the stop members 182. The guide plate 186 is supported on a plurality of posts, such as the posts 190, and by a corresponding plurality of screws extending through the guide plate and into respective ones of the posts. In this manner, the stop members 182 of the different groups can be selectively moved upwardly to extend through corresponding ones of the slots 188 in the guide plate 186. These upwardly extending stop members are then engaged by the ends 162 of the extension members 122 to set the digit positions of the different actuator racks 114.

Each of the yokes 184 is pivotally mounted on a pin, such as the pin 196 (FIGURES 7, 8 and 10) for rotation about the axis of the particular pin. The pins 196 are supported by side members 189 which are formed integral with the guide plate 186, as best shown in FIGURE 8. Each of the pins 196 extends through slots 206 in their associated stop members 182. These slots 206 permit limited vertical movement of the respective stop members 182. Each of the stop members 182 may be moved vertically from a lower position in which its upper extremity is below the plane of the top of the guide plate 186. Each of the stop members 182 may be moved to an upper position in which the upper end of the particular stop member extends through the corresponding slot 188 in the guide plate to stop the rearward motion of the corresponding extension member 122. In its upper position, each stop member 182 limits the rearward motion of the corresponding extension member 122 by engaging the end member 162 secured to the end of that extension member.

One of the arms of each of the yokes 184 is provided with an extension bracket 210, as best shown in FIGURE 10. The free extremity of each extension bracket 210 is mechanically coupled to the armature 212 of a solenoid 214. Each time one of the solenoids 214 is energized, therefore, its corresponding yoke 184 is caused to pivot in a counter clockwise direction in FIGURE 7 about the axis of its corresponding pin 106. A coil spring 216 (FIGURE 10) is mounted on the armature of each solenoid to bias the corresponding yoke in a clockwise direction about the axis of the corresponding pin 106 to return the yoke to its original angular position when its corresponding solenoid is de-energized.

The solenoids 214 are mounted on the guide plate 186 (FIGURE 7) by means of a corresponding plurality of brackets 218. It will be observed from an examination of FIGURE 7 that certain ones of the brackets 218 extend upwardly and alternate ones extend downwardly. It will also be noted that the solenoids 214 are mounted so that certain ones of the solenoids are up above the plane of the guide plate 186, and alternate ones of the solenoids 214 are mounted below the plane of the guide plate. This staggered relationship of the solenoids 214 serves to conserve space, in that it enables adjacent ones of the solenoids to be mounted one over the other without interfering with the operation of one another.

Figure 11:
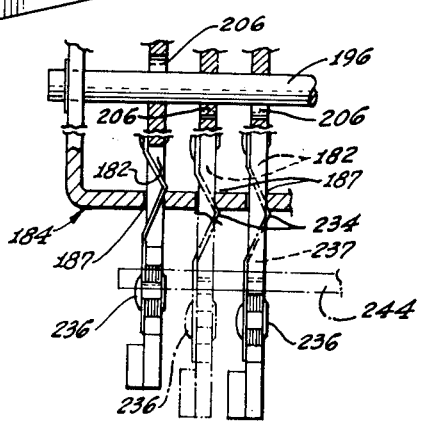
FIGURE 11 is a fragmentary view, partially in section, and illustrating the yoke of FIGURE 10 and the manner in which the different stop members are supported in the yoke.

As shown more clearly in FIGURES 10 and 11, each of the stop members 182 of the different groups have their lower ends extending downwardly through a plurality of slots 187 in the cross members of the corresponding yoke 184. The lower extremity of each of the stop members 182 has a triangular configuration, as best shown in FIGURES 7 and 10. That is, the lower end of each stop member has a first angularly inclined face 230 and a second angularly inclined face 232 which meet at an apex at the extremity of the corresponding stop member.

A flat spring-like resilient strip 234 is fastened to the lower end of each of the stop members 182 by means of a pair of rivets 236. Each resilient strip 234 has a central portion which is shaped to form an apex extending through an opening 237 in its stop member to protrude beyond the opposite side of the stop member, as best shown in FIGURE 11. Each of the spring strips 234 is positioned in a corresponding one of the slots 187 in the cross member of its yoke 184. When one of the stop members 182 is moved upwardly and into the corresponding slot 187 in the yoke 184, its spring strip is moved so that its apex is above the cross member, this being illustrated by the left hand stop member in FIGURE 11. On the other hand, when the stop member is moved to its lower position the apex of the spring strip 234 is below the cross member, as shown by the other two stop members 182 in FIGURE 11. The spring strips 234 serve, therefore, to hold the respective stop members 182 in either their upper position or their lower position. A positive force is required, therefore, to move the stop members to either of these positions.

One edge of the lower end of each of the stop members 183 has a pair of serrations formed in it, the upper serration being designated 240 and the lower serration being designated 242 in FIGURE 10. As also shown in FIGURE 10, a plurality of stationary detent bars 244 are mounted on a pair of supporting brackets, such as the brackets 246, by means of a corresponding plurality of screws, such as the screws 248. These detent bars are positioned to extend transversely of the serrated edges of the stop members 182 in each group.

When a stop member 182 is moved to its upper position, the lower serration 242 of the stop member engages its corresponding detent bar 244, and that stop member is held in its upper position by the detent bar and by the pressure of its spring strip 234. On the other hand, whenever a stop member 182 is moved to its lower position, the upper serration 240 of the stop member engages its corresponding detent bar, and that stop member is maintained in its lower position by the detent bar and by the pressure of its spring strip 234.

When a stop member 182 is in its upper position, the upper end of that stop member protrudes through the corresponding slot 188 (FIGURES 7 and 10) in the guide plate 186 (as explained above). The stop member is now in a position to engage the end 162 (FIGURE 7) of the corresponding extension member 122, as that extension member is moved back over the tops of the different guide members 122 in the corresponding group.

A plate 217 (FIGURE 9) is supported over the plate 186 for vertical reciprocal movement in a pair of end brackets 189. The brackets 189, in turn, are mounted on the plate 186 by a pair of screws 191. The plate 217 extends over the tops of the stop members 182. The plate 217 is normally biased away from the stop members by suitable springs (not shown). However, when a pair of solenoids 215 are energized, the plate 217 is forced down on any stop members protruding through the plate 186 to move the same to their lower position. The solenoids 215 are mounted on a bracket 217 which, in turn, is supported on the plate 186. The armatures of the solenoids 215 are appropriately coupled to the plate 217.

The solenoids 215 form, therefore, common clearing solenoids. For, when these solenoids are energized, all of the stop members 182, which were previously moved to their upper position, are returned to their lower position.

As best shown in FIGURE 7, a plurality of horizontal transverse, serrated digit selector actuator members 250 are slidably mounted in the adapter mechanism 102. The actuator members 250 are slidably mounted in brackets, such as the bracket 252, at their opposite ends. These members are positioned in spaced parallel relationship, and they extend transversely to the lower extremities of respective ones of the stop members 182 in the yokes 184. The arrangement is such that the lower end of each of the stop members in each group is received in a serration of a respective one of the actuator members 250. In this manner, any one of the actuator members 250 is capable of engaging a corresponding one of the stop members 182 in any one of the yokes 184, when that particular yoke is moved to a position by its solenoid 214 to permit its stop member to be so engaged.

The brackets 252, as shown in FIGURES 7 and 12, are in the form of channel members which are slotted to slidably receive the ends of respective ones of the serrated digit selector actuator members 250. These brackets may be secured to the lower frame 251 of the adapter by screws, such as the screws 254 in FIGURE 12. The left hand bracket 252 in FIGURES 7 and 12 has a rear lip 256. This lip serves to limit the travel of the individual actuator members 250 as they are spring biased to the left in these figures, as will be described.

Each of the digit selector actuator members 250 has a downwardly extending projection 258 (FIGURES 7 and 8). The projection of each actuator member is mechanically coupled to the armature 260 of a corresponding solenoid 262 (FIGURE 7). As shown in FIGURE 13, the solenoids 262 are mounted on the under side of the frame 251 of the adapter. Referring again to FIGURE 7, it will be seen that a coil spring 264 is mounted on the armature 260 of each solenoid 262 to bias the corresponding actuator member 250 to the left in FIGURE 7 and against the lip 256 of the bracket 252 when its corresponding solenoid 262 is not engaged.

Therefore, there are provided a plurality of digit selector actuator members 250 equal in number to the number of stop members 182 in each yoke 184. Each of the actuator members 250, as mentioned, extends transversely to the lower end of a corresponding one of the stop members 182 in each of the yokes 184, with each stop member extending into a corresponding serration in its particular actuator member 250. In the illustrated embodiment, each yoke supports nine stop members 182 corresponding to nine digits of from 0 to 8, and a corresponding number of nine actuator members 250 are provided. The 9 digit position is assumed by any of the actuator racks 114 when no corresponding stop member 182 is moved to its upper position.

As mentioned above, the solenoids 262 are positioned on the under side of the bottom frame 251 of the adapter mechanism 180. This is most clearly shown in FIGURE 13, as noted, and the illustrated staggered relationship of the solenoids 262 permits them to be mounted in a minimum of space without interference with one another. As also shown in FIGURE 13, the projections 258 from the respective actuators 250 extend downwardly through slots 266 in the frame 251 and into coupled relationship with respective ones of the armatures 260.

In the illustrated embodiment of the invention, and as shown for example in FIGURE 9, the accounting machine 100 includes 11 actuator racks, each corresponding to a different ordinal position of a group of numbers which are accumulated in the machine. For example, the right hand rack in FIGURE 9 may represent units, the adjacent rack may represent tens, the next adjacent rack may represent hundreds, and so on. Each of the racks 114 is mechanically coupled to a corresponding extension arm 122.

When the actuator racks 114 are released, by a control to be described, the keyboard keys of the accounting machine are actuated so that the racks each tend to move toward the corresponding 9 digit position. This causes their corresponding extension members 122 to move across the tops of the stop members 182 in the different yokes 184. The movement of the different rack members is arrested by a previously selected and raised one of the stop members in each yoke. The selected stop member in each yoke is moved to its upper position, and it serves to engage the end of the corresponding extension member 122 to arrest the actuator rack coupled to it at a particular digit position.

Therefore, by the proper selection of a stop member 182 in each of the yokes 184, each of the different actuator racks 114 can be arrested at any desired digit position. The arrangement is such that if no stop member in the group is selected, the corresponding actuator rack moves to the 9 position, as mentioned above.

In a manner to be described, the actuator racks 114 are all held in a retracted position in the accounting machine 100 until the stop members 182 have been selectively moved into the respective paths of the extension members 122. Then, the motor bar is actuated to release the actuator racks 114, and they all move downwardly in FIGURE 9. The motion of each actuator rack continues until the end of its extension member engages a stop member 182 which has previously been moved upwardly into its path. The actuator racks 114 are then held by different ones of the stop members in positions representing the different digits of a multi-digit number. The racks are then moved back to their original position during a subsequent portion of the motor bar cycle.

To set up the stop members 182, the solenoids 215 are first energized to clear all the yokes 184, and set all the stop members 182 to their lower position. Then, each yoke 184 is pivoted by its solenoid 214 in sequence. As the solenoid 214 coupled to the first yoke 184 is energized, and as shown in FIGURE 10, the yoke is swung in a clockwise direction so that the inclined surface 232 of the lower end of each stop member engages the trailing inclined surface of its associated actuator rack 250. This is shown by the dashed lines in FIGURE 10, and this occurs because all of the stop members 182 have been cleared and moved to their lower position. Now, a selected one of the stop members 182 may be moved to its upper position by shifting its corresponding digit actuator member 250 to the right in FIGURE 10. The solenoid 214 may then be de-energized, and the spring 216 swings the corresponding yoke 184 in a counter clockwise direction. This causes all the stop members 182, with the exception of the actuated one, to remain in their lower position and to be engaged by the corresponding detent bar 244 in their upper serrations 240. The actuated stop member, on the other hand, is moved to its upper position and engaged by the detent bar 244 in its lower serration 242.

In the manner described above, a selected one of the stop members 182 in a particular group is set in its upper position. The particular group is selected by energizing the solenoid 214 and the particular stop member in the group is actuated to its upper position by the concurrent energizing of the solenoid 262 which is coupled to the actuator member 250 corresponding to the stop member 182 which is to be actuated.

It will be realized that to actuate any stop member 182 in a yoke 184, it is necessary that the corresponding solenoid 214 be energized prior to or concurrently with the movement of a selected one of the actuators 250. In this manner, the stop members can be set up from group to group by the successively energizing of the solenoids 214 and by the subsequent or concurrent energizing of selected ones of the solenoids 262.

More specifically, after a particular yoke 184 has been cleared, and when a solenoid 262 (corresponding to a desired digit in the group) is energized, the corresponding actuator 250 is moved to the right in FIGURE 10 to swing the associated stop member 182 in a counter clockwise direction and upwardly in its slot 188 in the guide plate 186. The upper end of each stop member 182 has an inclined edge to permit the stop member to move through the slot 188 to its upper position upon such actuation. The actuated stop member 182 has its lower serration 242 snapped into engagement with the associated detent bar 244 when the corresponding solenoid 214 is de-energized. This causes the selected and actuated stop member 182 to be held in its upper position so that its corresponding actuator rack 114 will be arrested at the digit position represented by the actuated stop member.

In the manner described above, each group of stop members 182 in the different yokes 184 can be selected by the energizing of the associated solenoid 214. Then, a stop member in each selected group can be actuated to its upper position by energizing a coresponding one of the solenoids 262. Then, when the corresponding solenoid 214 is de-energized, the coil spring 216 causes the yoke to swing back so that the stop members supported in it, except the actuated one, engage the corresponding detent bar 244 with their upper serrations 240, while the actuated stop member engages the detent bar with its lower serration 242.

As explained above, none of the stop members 182 in any particular group can be moved by the actuator members 250 unless the solenoid 214 associated with that group is first energized to move the corresponding yoke 184 to the position shown by the dashed lines in FIGURE 10. For unless the stop members are in the position shown by the solid lines in FIGURE 10, they are displaced from the trailing edges of the serrations in the actuator members 250, so that movement of the actuator members does not produce any movement of the particular stop members.

By the same token, when a group of stop members 182 is selected by energizing its corresponding solenoid 214, none of the stop members in the group is moved to its upper position by that action alone. There is required a concurrent movement of one of the actuator members 250 to actually move a stop member in the group to its upper position. Therefore, when a group of stop members 182 is selected by energizing the corresponding solenoid 214, one of the solenoids 262 is then energized to move a corresponding one of the stop members in the selected group to its upper position.

In the manner described above, therefore, the actuator racks 114 in the accounting machine 100 may be set to the different digit positions of the number being loaded into the machine. After the settings of the actuator racks have been carried out, the number represented by the different positions of the racks is transferred by normal accounting machine operation into the accumulator register of the machine.

The solenoids 214 and 262 may be selectively energized by the control system shown in FIGURE 14. It will be remembered that in order to move a selected stop member in a selected yoke to its upper position, the rack-selector solenoid 213 corresponding to that yoke is energized and a selected one of the digit-selector solenoids 262 is concurrently energized.

In the control system of FIGURE 14, the contacts actuated by any particular relay are designated by the same number as the relay winding. Also, normally open contacts are shown open and normally closed contacts are shown closed. A plurality of diodes are included in the system shown in FIGURE 14. These diodes perform usual known functions, and they will not be referred to specifically in the ensuing description.

In FIGURE 14, the group of switches 9, 1, 2, 3, 4, 5, 6, 7, 8, 9, 0 and 11 enclosed in the rectangle 321 are included in the card reading mechanism 30 of FIGURE 2. As one of the information cards 10 of FIGURE 1 is transported through the card reading mechanism 30 in a column-by-column sequence, different ones of these switches close as determined by the punches in the different columns. The switches 9, 1, 2, 3, 4, 5, 6, 7, 8, 9, 0 and 11 become closed in accordance with the production of signals on the leads connected to the different switches. These different leads are shown in the upper right corner of FIGURE 9 of Von Rein Patent 2,217,209 and are connected to a plurality of magnets, all of which are indicated by the numeral 60. Each of the different magnets 60 in the Von Rein patent become energized when a hole representing a corresponding number is sensed on the information card. This is described in the second column on page 4 of the Von Rein patent.

The switches 138a, 138b, etc. are described in conjunction with FIGURE 5 and are positioned to scan the auxiliary program card 137 of FIGURE 6. The switches 138a, 138b, etc. are illustrated in FIGURE 14 as the switches 1, 2, 3, 4, 5, 6, 7, 8, 9, 0, 11 enclosed in the rectangle 322.

The armatures of the information card switches in the rectangle 321 are all connected through a diode D11 to the normally open contacts L23(1–3) of a relay L23. The armatures of the auxiliary program card switches in the rectangle 322 are connected through a diode D100 to the armatures of the switches in the rectangle 321.

The fixed contact of the 9 information card switches is open circuited. The fixed contacts of the information card switches 1, 2, 3, 4, 5, 6, 7, 8, 0 and 11 in the rectangle 321 are respectively connected to a plurality of relays L34, L35, L36, L37, L37, L38, L39, L40, L41, L42 and L64. These relays are all connected to the positive terminal of a 150 volt direct voltage source. The relay L64 is shunted by a capacitor 401 of, for example, 4 microfarads and a series resistor 403 of, for example, 100 ohms. The capacitor provides a time delay in the de-energizing of the relay L64. The relays L34—L42 are further connected respectively to a plurality of latching resistors 405, 407, 409, 411, 413, 415, 417, 419, 421 each of which may have a value of 47 kilo-ohms. Respecting latching contacts L34—L42 are connected to the latching resistors and to a lead 420.

The auxiliary program card switch 12 in the rectangle 322 has its fixed contact connected to each of a pair of relays L60 and L61. The armature of this switch is grounded. These relays are connected to the positive terminal of the 150 volt direct voltage source, and these relays are shunted by a capacitor 423 and a series resistor 425 for arc suppression purposes. The capacitor may have a value of .02 microfarads, and the resistor may have a value of 1 kilo-ohm.

The fixed contacts of the switches 1, 2, 3 and 4 in the rectangle 322 are respectively connected to the armatures 1 and 8 of the contacts L60 of a relay L60, and to the armatures 1 and 8 of the contacts L61 of a relay L61. The fixed contact 3 of the contacts L60 is connected to a relay L52, the fixed contact 4 of the contacts L60 is connected to a relay L1, the fixed contact 6 of the contacts L60 is connected to a relay L53, the fixed contact 5 of the contacts L60 is connected to the relay L2. Likewise, the fixed contacts 3, 4, 6 and 5 of the contacts L61 are respectively connected to a plurality of relays L54, L3, L55 and L4. The fixed contacts of the remaining switches 5, 6, 7, 8, 9, 0 and 11 in the rectangle 322 are connected respectively to a plurality of relays L5, L6, L7, L8, L9, L10 and L21.

The relays L52, L1, L53, L2, L54, L3, L55, L4, L5, L6, L7, L8, L9, L10 and L21 are all connected to the positive terminal of the 150 volt direct voltage source. All these relays, with the exception of the relay L21 are connected to corresponding latching resistors 427, 429, 431, 433, 435, 437, 439, 441, 443, 445, 447, 449, 451 and 453. These resistors may each have a resistance of 47 kilo-ohms and all are connected to the lead 420. The relays are also connected to respective contacts L56, L11, L57, L12, L58, L13, L59, L14, L15, L16, L17, L18, L19 and L20. These latter contacts are controlled by a corresponding plurality of similarly designated memory relays, and the contacts are all connected to the fixed contact 3 of the contacts L30.

The memory relays L56, L11, L57, L12, L58, L13, L59, L14, L15, L16, L17, L18, L19, and L20 are all connected to the positive terminal of the 150 volt direct voltage source. These relays are also respectively connected to a plurality of relay contacts L52(6–8), L1(6–8), L53(6–8), L2(6–8), L54(6–8), L3(6–8), L55(6–8), L4(6–8), L5(6–8), . . . L10(6–8). These relay contacts are connected to a resistor 410 of 47 kilo-ohms, and to the fixed contact 4 of relay contacts L21. The resistor 410 is connected to the relay L30, and the armature 1 of the relay contacts L30 is grounded. A further plurality of latching contacts L56(6–8), L11(6–8), L57(6–8), L12((6–8), L58(6–8), L13(6–8), L59(6–8), L14(6–8) . . . L20(6–8) are connected to respective ones of the memory relays and to a reset lead 455. This latter lead is connected to a reset contact M2 whose armature is grounded, and which is actuated by the accounting machine in a manner to be described.

The digit solenoids S1–S9 are all connected to the positive terminal of a 175 volt direct voltage source. These solenoids are also connected to respective ones of a plurality of relay contacts L34(3–1), L35(3–1) . . . L42(3–1). These contacts are also connected to the common lead 420. The solenoid S9 is also connected to the armature 6 of the relay contacts L63. These latter contacts include a fixed contact 4 which is connected to the fixed contact 3 of the relay contacts L42, and a fixed contact 7 which is grounded. A capacitor 457 and a series resistor 459 are shunted across the contacts L30(6–7). The capacitor has a capacity of .1 microfarad and the resistor has a resistance of 10 ohms.

The rack solenoids S10–S24 are all connected to the armature 1 of relay contacts L33. The fixed contact 3 of those relay contacts is connected to the positive terminal of the 175 volt direct voltage source, and the fixed contact 4 is connected to the positive terminal of the 150 volt direct voltage source. These solenoids are also connected to respective ones of a plurality of relay contacts L1–L10 and L52–L55. These relay contacts are all connected to the common lead 420.

The lead 420 is connected to the fixed contact of a cam-operated switch P6, the armature of which is grounded. A pair of relay contacts L44(7–6) and L45(7–6) are connected in series between the lead 420 and ground. These contacts are shunted by a 1.0 microfarad capacitor 461 and a 10 ohm resistor 463. A group of relays L30, L63 and L33 are connected to the positive terminal of the 150 volt direct voltage source. The relays L63 and L33 are connected to the armature 6 of the relay contacts L44 and to the fixed contact 3 of relay contacts L29. The armature 1 of the relay contacts L29 is grounded. A capacitor 465 of 2 microfarads and a resistor 414 of 100 ohms are shunted in series across the relay L33.

The relay L30 is connected to the fixed contact 6 of the relay contacts L33. The armature 8 of the relay contacts L33 is connected to a 1 microfarad capacitor 416, and the contact 5 is connected to a 1 kilo-ohm resistor 467. Both the resistor and capacitor are connected to the fixed contact 4 of the relay contacts L29.

The reset contact M2 is connected to the relay contacts L32(6–8); which, in turn, are connected to the relay contacts L46(8–6), to the relay L27, and to the normally open contact of a "start" switch. The armature of the "start" switch is grounded. The contacts L46(8–6) are connected to a relay L32. This relay, and the relay L27, are connected to the positive terminal of the 150 volt direct voltage source. The relay L27 is shunted by a 100 ohm resistor 469 and by a 4 microfarad capacitor 440.

The fixed contact 3 of the relay contacts L30 is connected to a plurality of relays L28, L44 and L45, and this contact is also connected to the relay contacts L28. These relays are all connected to the positive terminal of the 150 volt direct voltage source. The contacts L28 are connected to the normally closed contacts of the "start" switch, and through a 33 kilo-ohm latching resistor 400 to a relay L47 and to the normally open contact of a "read" switch. The relay L47 is connected through a resistor 471 to the positive terminal of the 150 volt direct voltage source, and the relay is shunted by a 10 kilo-ohm resistor 473.

The "read" switch is cam operated by the accounting machine. It has a normally closed fixed contact which is connected to a 1 kilo-ohm resistor 475 and an armature which is connected to a capacitor 477. The resistor and capacitor are connected to an "on-off" switch.

The system also includes a "reset" switch which has a grounded armature, and which has a fixed contact connected to a relay L43 and to the fixed contact 4 of relay contacts L27. The relay L43 is connected to the positive terminal of the 150 volt direct voltage source. The armature 1 of the relay contacts L27 is connected to a capacitor 479 of 20 microfarads, and the fixed contact 3 is connected to a 1 kilo-ohm resistor 481. The capacitor and resistor are connected to grounded relay contacts L32(3–1).

The relay L22 is connected to a 5 kilo-ohm resistor 483 which, in turn, is connected to the positive terminal of the 150 volt direct voltage source. This relay is connected to a latching resistor 402 of 47 kilo-ohms, and to a pair of grounded relay contacts L48 and L21. The resistor 402 is connected to a pair of grounded contacts L43(4–6).

The relay L29 is connected to the positive terminal of the 150 volt source of direct voltage and to the fixed contact 3 of the relay contacts L21. This relay is shunted by a 1.5 microfarad capacitor 412 and a 100 ohm resistor 487. The armature 1 of the contacts L21 is connected to the fixed contact 4 of the relay contacts L23. The armature 1 of these contacts is connected to the fixed contact of a cam-actuated switch P5. The armature of the cam-actuated switch P5 is grounded.

The contact 3 of the switch L23 is also connected to a pair of relays L25 and L26. These relays, and a relay L46, are all connected to the positive terminal of the 150 volt direct voltage source. The relays L25 and L26 are connected to the fixed contact 3 of relay contacts L25, and the relay L46 is connected to the armature 1 of relay contacts L46. The fixed contact 3 of the relay contacts L46 is connected to the reset lead 455.

The armature of the "on-off" switch is connected to the fixed contact of a "carriage stop" switch and to the fixed contact of a "carriage reverse" switch. The armature of the first switch is grounded, and the armature of the second switch is connected to the armature 1 of relay contacts L62 and to the relay L62. The relay L62 is grounded, and it is shunted by a 4 microfarad capacitor 491 and a 100 ohm resistor 493. This armature is also connected to a 10 kilo-ohm resistor 495 which is connected to the positive terminal of the 150 volt direct voltage source.

The fixed contact 4 of the relay contacts L62 is connected to a 1 kilo-ohm resistor 497, and to a 1 microfarad capacitor 499. The resistor is connected to the fixed contact 4, and the capacitor is connected to the armature 1 of relay contacts L28. The fixed contact 3 of these relay contacts is connected to the relay L31. This relay is connected to the positive terminal of the 150 volt direct voltage source.

The relay L31 controls the relay contacts L31(3–1). The armature of these relay contacts is grounded, and the fixed contact is connected to a solenoid M4. This solenoid controls the motor bar of the accounting machine. It is connected to the positive terminal of the 150 volt direct voltage source.

The armature 1 of the relay contacts L25 is connected to the fixed contact 5 of the relay contacts L22 and to the relay L23. The relay L23 is connected to the positive terminal of the 150 volt direct voltage source. The fixed contact 4 of the relay switch L25 is connected to a relay L24. This latter relay is connected to the positive terminal of the 150 volt direct voltage source through a cam-operated switch P1. The cam-operated switches P1, P5 and P6 are all located in the key punch and card reader mechanism of FIGURE 2. These are all controlled by cams mounted on a common shaft and in a manner to be explained.

The relay L24 controls the relay contacts L24(3–1). The armature of these contacts is grounded and the fixed contact is connected to a scanning clutch in the card reading mechanism 30 of FIGURE 2.

The armature 8 of the relay contacts L22 is connected to the armature 1 of relay contacts L64, to the fixed contact 3 of relay contacts L47, and to a latching resistor 501. The latching resistor may have a resistance of 47 kilo-ohms, and it is connected to the fixed contact 6 of relay contacts L23. The armature 8 of these contacts is grounded.

The armature 1 of the relay contacts L47 is connected to the fixed contact 4 of the relay contacts L43. The armature 6 of these relay contacts is grounded, and the fixed contact 7 is connected to the clearing solenoids 215 of FIGURE 9 which serve to return the stop pins 182 to their lower position. The solenoids 215 are connected to the positive terminal of the 150 volt direct voltage source. A 1 microfarad capacitor 503 and a series resistor 505 of 10 ohms are connected between the fixed contact 7 of the relay contacts L43 and ground.

As mentioned above, each field of information from the information cards 10 (FIGURE 1) is successive read from the card reading mechanism 30 of the key punch and card reading unit 20 of FIGURE 2 into the accounting machine 100 of FIGURE 3.

At the termination of such a read-in operation of any particular field, the switch 11 of the rectangle 322 closes so that a hole is provided at the 11 digit position in the auxiliary program card 137 of FIGURE 6 at the end of each field. This causes the relay L21 to become energized so as to close the contacts L21 and energize the relay L22. The relay L22 now latches through the resistor 402 until the relay L43 is energized to open its contacts L43(4–6).

At the termination of the read-in operation of a particular field, the motor bar is operated in a manner to be described and the accounting machine goes through its cycle of transferring the digits sensed by the actuator racks 114 to the accumulator registers of the machine and of returning the racks to their reference position.

When the racks are so returned to their reference position at the end of a field read-in operation, this causes the relay L32 to be momentarily energized by the closing of the "start" switch to close the contacts L32(1–3) and energize the solenoids 215. The energizing of the solenoids 215 causes all the stop pin members 182 to be set to their lower position in the manner described above.

When the relay L43 becomes energized to return the stop pin members 182 to their lower positions, the contacts L43(4–6) open to de-energize the relay L22. The subsequent re-closure of these contacts as the relay L43 is de-energized does not re-energize the relay L22 because of the resistor 402. This resistor permits sufficient current to flow through the relay L22 to hold the relay energized, but not enough actually to energize the relay. The relay L22 therefore is energized at the end of each field read-in operation and remains energized until the stop members 182 have been returned to their lower positions in readiness for the next field read-in.

At the termination of the field read-in operation, such as described in the preceding paragraphs, the carriage 104 of the accounting machine 100 of FIGURE 3 is moved from one of the mechanical stops 110 to another to set the carriage to a position such that the next field may be read into the accounting machine.

A plurality of switch actuators are positioned on the form bar 105 of the accounting machine 100 in FIGURE 3. These switch actuators are positioned to close the "read" switch in FIGURE 14 each time the carriage 104 (FIGURE 3) is so moved from one position to the next to enable a new field to be read into the accounting machine from the card reading mechanism. The carriage is arrested at these different positions by the mechanical stops 110 (FIGURE 3) which are normally included in the accounting machine.

When the "read" switch is so closed, the relay L47 is energized, and it latches through the resistor 400 and through the "start" switch. The "start" switch opens about midway through the accounting machine cycle, and this causes the relay L47 to become de-energized. In this manner, the relay L47 is energized at the beginning of each field reading operation, and it remains energized during such reading operation. The relay L47 is de-energized when the accounting machine cycles. As soon as the accounting machine cycles, its carriage can move to the next stop to where a cam can close the read switch again to energize the relay L47. Upon such completion of the preceding field reading operation, and as described above, the relay L22 is de-energized to cause the contacts L22(8–5) to close and the relay L43 is de-energized to cause the contacts L43(4–6) to close. This permits the relay L47 to energize the relay L23 through its normally open contacts L47(1–3). The relay L23 now latches itself through its contacts L23(6–8).

When the relay L47 is energized, the closure of its contacts L47(1–3) completes an energizing circuit to the relay L24 through the normally closed contacts L25(1–4). The relay 24 is controlled by the cam-operated switch P1 in the card reading mechanism 30 of FIGURE 2. The relay 24, when energized, closes its contacts L24(1–3) to energize the clutch mechanism in the card reader 30 of FIGURE 2.

The cam-operated switch P5 in the card reading mechanism is operated in synchronism with the switch P1. The switch P1 is controlled, for example, to open at 0° angular position of the cam and to close at 180° angular position. The card reading mechanism is at rest at 345°. Therefore, the switch P1 is closed when the card reading mechanism is at rest. The switch P5, on the other hand, is controlled to close at 86° angular position of the cam and to open at 166°. The cam arrangements for controlling the operation of the switches P1, P5 and P6 are shown in FIGURES 3, 6, 16 and 19 of Johnson Patent 2,684,719 and are described in detail in columns 21, 22 and 23 of the Johnson specification.

Therefore, when the cam reaches 0° the switch P1 opens to de-energize the relay L24 and stop the card in the card reading mechanism at the next column to be read. At 86° of the cam, the switch P5 closes to energize the relays L25, L26 and L46. The energizing of the relay L25 opens the contacts L25(1–4) to prevent the relay L24 from being energized so long as the relay L25 is energized. The relay L25 latches with the relay L23 through its contacts L25(1–3) and remains energized until the last column of the field is sensed, at which time the relay L22 is energized (as described above) to open the contact L22(5–8).

The relay L46 is latched by its contacts L46(1–3) and this relay remains energized until the reset action is completed at the end of the field read-in operation and the accounting machine has cycled. Then the reset contact M2 opens to de-energize the relay L46.

The relay L26, on the other hand, is energized and de-energized with each opening and closing of the cam-operated switch P5; except that the last actuation in each field of that switch is blocked by the de-energizing of the relay L23 and the opening of its contacts L23(1–3). The relay L26 energizes the space interposer of the card reading mechanism 30 of FIGURE 2. Each new field is started with the information storage card in position in the card reading mechanism such that the first column of the new field may be read. The relay L24 energizes the clutch mechanism of the card reader to cause the first column of the new field to be sensed without moving the card. Then the relay L26 causes the card to be moved from column to column in the card reader by repeatedly energizing the spacer interposer each time the cam-operated switch P5 is closed.

Each time the switch P5 closes, one of the nine relays L34–L42 is energized, depending upon the position of the hole in the column of the information card being processed at that particular time. These holes, as explained, cause the switches 9, 1, 2, 3 . . . 7, 8, 0 in the rectangle 321 selectively to close. The relays L34–L42 are latched when energized, and this latching takes place through respective ones of the contacts L34(8–6) to L42(6–8). The latching remains until the cam-operated switch P6 opens. This latter switch is included in the card reader and is operated in synchronism with the cam-operated switches P1 and P5. The switch P6 closes at the 120° angular position of the cam and opens at the 330° angular position of the cam.

The relays L34–L42 control contacts L34(1–3) . . . L41(1–3) respectively, and these latter contacts control respective ones of the digit solenoids 262. These are represented as S1–S9 in FIGURE 14. The relay contacts L34(1–3) . . . L41(1–3) are protected by the switch P6 from making and breaking the heavy solenoid coil currents of the solenoids S1–S9.

In like manner, the selective closure of the auxiliary program card switches 1, 2 . . . 8, 9, 0 in the rectangle 322, causes the relays L52, L1, L53, L2, L54, L3, L55, L4, L5, L6, L7, L8, L9 and L10 to be selectively energized. These relays in turn selectively energize the rack solenoids 214 which are designated, in FIGURE 14 as S10, S11, S12, S13, S14, S15, S16, S17, S18, S19, S21, S22, S23, S24. This selective energizing is through the contacts L1(1–3) . . . L10(1–3), L52(1–3) . . . L5(1–3).

The assembly includes an additional auxiliary program card switch 12, and when that switch is closed, the relays L60 and L61 are energized. This causes the auxiliary switches 1, 2, 3 and 4 to selectively energize the relays L52, L53, L54 and L55 rather than the relays L1–L5. This causes the rack solenoids S21–S24 to be selected, rather than the rack solenoids S10–S14.

The assembly also includes a group of memory relays L56, L11, L57, L12, L58, L13, L59, L14, L15, L16, L17, L18, L19 and L20. These relays are selectively energized by the rack relays through the contacts L52(6–8), L1(6–8), L53(6–8), L2(6–8) . . . . L10(6–8). As a particular rack relay is energized by the closure of the switch P5 and of the corresponding auxiliary program switch, it is latched until the switch P6 opens, as noted above. When a rack relay is energized, it causes its corresponding memory relay to be energized. The energized memory relays remain energized by virtue of the latching contacts L56(6–8), L11(6–8) . . . L20(6–8) until the reset contact M2 is opened after the accounting machine has cycled at the completion of the read-in operation of the particular field.

To terminate the read-in operation of any particular field, an 11 is punched in the auxiliary program card in the last column of each field, as mentioned above. This causes the relay L21 to be energized when the cam-operated switch P5 closes. This relay then latches through the resistor and through the contacts L30(4–1) until the relay L30 is energized. The relay L21 energizes the relay L22 which latches through the resistor 402 until the relay L43 is energized to open the contacts L43(4–6). As mentioned above, the relay L43 is energized after the accounting machine has cycled. When the relay L22 is energized, it opens its contacts L22(5–8) to de-energize the relays L23 and L25. The relay L22 remains energized until the completion of the field read-in operation, and then it is de-energized to initiate the reset field read-in operation as described above.

When the card moves off the last column of the field, a final pulse is produced by the cam-operated switch P5. Because the relay L23 is now de-energized, this pulse energizes the relay L29 rather than the relay L26 through the contacts L23(1–4). The capacitor 412 causes the relay L29 to have a de-energizing delay of the order, for example, of .08 second after its energizing circuit is opened. The relay L29 energizes the relays L63 and L38 through the contacts L29(1–3). These latter relays also exhibit a de-energizing time delay by virtue of the shunting capacitor 414. The energizing of the relay L33 causes the contacts L33(1–3) to close to increase the exciting voltage to the rack solenoids from +150 volts to +175 volts. The energizing of the relay L63 causes the contacts L63(6–7) to close to energize the 0 digit solenoid S9.

When the relay L29 is de-energized, it causes the relay L30 to be energized through the contacts L29(1–4) and L33(8–6). The series capacitor 416 causes the relay L30 to become de-energized after a predetermined time delay. The energizing of the relay L30 causes the contacts L30(1–3) to close so that all the rack relays which were not previously energized are now energized. This latter energizing is achieved through the normally closed memory relay contacts L56, L11 . . . L20. The energizing is directed to all the rack relays which do not have their respective memory relays latched.

The action described above enables a zero digit to be established, by moving the zero digit stop member 182 to its upper position, in each group of stop members which were not previously actuated during the particular field read-in operation. To achieve this, the zero digit solenoid is energized and held, and the rack solenoids corresponding to the unactuated groups of stop members are energized in parallel; these operations being carried out in the manner described in the preceding paragraphs.

The energizing of the relay L30 also causes the relays L44, L45 and L28 to be energized as the contacts L30(1-3) close. The purpose of the contacts L44(7-6) and L45(7-6) which are connected in series between the common lead 420 and ground, is to make and break the relatively heavy current energizing circuit to the rack solenoid 214 during the "set-zero" operation described above. The rack relays are latched through their series resistors to prevent them from becoming de-energized before the contacts L44(7-6) and L45(7-6) have opened.

When the relay L30 is energized to perform the zero-setting operation, the relay L21 is de-energized due to the opening of the contacts L30(1-4). The memory relays, moreover, are blocked when these contacts open.

The system is now ready for the accounting machine to cycle and transfer the multi-digit number from the actuator racks to the accumulator registers of the machine. This cycle is initiated as mentioned above, by the actuation of the motor bar of the accounting machine. The time lag in the accounting machine permits, however, the motor bar to be actuated while the zero-setting operations described above are still in process. This is achieved in the following manner:

When the relay L30 energizes the relay L28 through the closure of the contacts L30(1-3), the relay L28 latches through its contacts L28 and through the start switch of the accounting machine. Before the motor bar solenoid can be energized, the carriage 104 (FIGURE 3) of the accounting machine must have been arrested on one of the stops 110. The "carriage stop" switch is closed only when the carriage is on a stop. When this occurs, the relay L62 is de-energized to cause the contacts L62(1-4) to close. Then, when the relay L28 is energized, its contacts L28(1-3) close to energize the relay L31. The latter relay, in turn, energizes the solenoid M4 to actuate the motor bar.

As the accounting machine cycles due to the actuation of the motor bar in the manner described above, the number established by the actuator racks 114 as controlled by the stop pins 182 is introduced into the accounting machine and the racks are returned to their reference position. The solenoids 215 may now be energized in the manner described above to return the actuated stop members 182 to their lower position.

As mentioned, the start switch is cam-operated by the accounting machine to energize the relay L27 at the end of the cycle. After the start switch opens, the relay L27 exhibits a time delay due to its shunting capacitor 440. This provides time for the actuator racks to settle in their reference position. Then, the relay L27 becomes de-energized to close the contacts L27(4-1) and the relay L43 is energized because the contacts L32(1-3) and the contacts L65(1-4) are now closed. The energizing of the relay L43 causes the contacts L43(6-7) to close to energize the solenoids 215. This causes the reset plate 217 (FIGURE 9) to move down the pins 182 and reset the pins to their lower position. When the reset plate bottoms it breaks the reset contacts M2 to de-energize the relays L46, L32 and L43. When the relay L43 is de-energized, the reset magnets 215 are released, and the reading of the next field may be commenced.

When the relay L43 is energized, the holding circuit for the relay L22 is broken. When the relay L43 is subsequently de-energized it provides a ground through its contacts L43(4-6) to permit the relay L47 to energize the relay L23 by closing the contacts L47(1-3). This initiates the above described scanning action for the next field.

The invention provides, therefore, an improved mechanism and system by means of which the information sensed from a plurality of information storage cards may be introduced to an accounting machine for totalizing purposes.

It is evident from the above description that the mechanism of the invention may be used to inter-couple a known type of card reading mechanism to a known type of accounting machine, and that this inter-coupling may be carried out with a minimum of interference with the internal components of the machine or mechanism and with a minimum of modifications to such components.

The system and apparatus of the invention represent substantial savings in time and labor costs of many accounting procedures, and it provides an extremely accurate and convenient means for mechanizing such procedures.

We claim:

1. Apparatus for entering data into an accounting machine for arithmetic computations on such data, said accounting machine including a plurality of rack members movable to different positions individually representative of the digits of each of a plurality of multi-digit numbers to be successively entered into the accounting machine, said apparatus including: a supporting structure, a plurality of movable actuating members supported in the supporting structure, means coupling respective ones of the actuating members to corresponding ones of the rack members in the accounting machine to obtain movements of the rack members in accordance with movements of the actuating members, a plurality of groups of stop members mounted on the supporting structure adjacent the respective paths of the actuating members, said stop members in each of the groups being individually movable between a stand-by position and an operative position in the path of the corresponding actuating member to arrest the movement of the actuating member for a control of the respective positions of the rack members, control means disposed for coupling to the stop members and responsive to input signals introduced to the control means for selectively moving the stop members to their operative positions, and means coupled to the control means for introducing input signals to the control means in representation of a succession of multi-digit numbers to be entered into the accounting machine for the performance of arithmetical operations on such numbers.

2. Apparatus for entering data into an accounting machine for arithmetic operation on such data, said accounting machine including a plurality of rack members reciprocally movable along linear paths to different positions individually representative of the digits of each of a plurality of multi-digit numbers to be successively entered into the accounting machine, said apparatus including: a supporting structure, a plurality of elongated members supported in the supporting structure to be reciprocally movable therein and to be axially aligned with respective ones of the rack members when the supporting structure is mounted on the accounting machine, means for coupling respective ones of the elongated members to corresponding ones of the rack members to obtain movements of the rack members in accordance with movements of the elongated members, a plurality of groups of stop members mounted on the supporting structure adjacent the respective paths of the elongated members, said stop members being individually movable between a stand-by position and an operative position in the path of the corresponding elongated member to arrest the movement of the corresponding elongated member for a control of the respective positions of the rack members, control means disposed for coupling to the stop members and responsive to input signals introduced to the control means for selectively moving the stop members to their operative positions, and means coupled to the control means for introducing input signals to the control means in representation of a plurality of multi-digit numbers to be entered into the accounting machine for arithmetic operation by the accounting machine on such numbers.

3. Apparatus for providing a controlled operation of an accounting machine, said accounting machine including a plurality of rack members movable to different positions individually representative of the digits of each of a plurality of multi-digit numbers to be successively entered into the accounting machine, said apparatus including: a supporting structure, a plurality of movable actuating members supported in the supporting structure, means for coupling respective ones of the actuating members to corresponding ones of the rack members in the accounting machine to obtain movements of the rack members in accordance with movements of the actuating members, a plurality of groups of stop members movably mounted on the supporting structure adjacent the respective paths of the actuating members, and means for selectively moving the stop members in different ones of the groups between a stand-by position out of the paths of the corresponding actuating members and an operative position in the respective paths of the corresponding actuating members to arrest the movement of the actuating members for a control of the respective positions of the rack members.

4. Apparatus for providing a controlled operation of an accounting machine, said accounting machine including a plurality of rack members movable to different positions individually representative of the digits of each of a plurality of multi-digit numbers to be successively entered into the accounting machine, said apparatus including: a supporting structure, a plurality of movable actuating members supported in the supporting structure, means for coupling respective ones of the actuating members to corresponding ones of the rack members in the accounting machine to obtain movements of the rack members in accordance with movements of the actuating members, a plurality of yoke members pivotally mounted in the supporting structure adjacent the respective paths of the actuating members and individually pivotable between a stand-by position and an operative position, and means including a plurality of groups of stop members respectively mounted in corresponding ones of said yoke members for individual movement in the yoke members between a stand-by position out of the path of the corresponding actuating members and an operative position in the path of the corresponding actuating member to arrest the actuating members for a control of the respective positions of the rack members.

5. The combination defined in claim 4 and which includes rack selector means for selectively moving said yoke members between the stand-by and operative positions, and digit selector means for selectively moving the stop members between the stand-by and operative positions when the yoke member corresponding thereto is so moved to its operative position.

6. Apparatus for totalizing numerical data stored in a series of punched information storage cards by means of a motor driven accumulator, said accumulator having a series of parallel actuator racks, one for each digit position, which racks project from the accumulator mechanism proportionately to the number set up in the accumulator for the respective digit position represented by each said rack, the positioning of said racks determining the number to be added at each totalizing by the accumulator, and said accumulator being set to urge all said racks to nine digit maximum positions and to repeat the same for addition, said apparatus including: a sensing unit for reading the digit figures on the punched cards, stop means to prevent movement of each actuator rack beyond the position that such actuator rack would assume for each different digit capable of being set in the accumulator, circuit means for momentarily positioning the stop means to prevent the actuator racks from assuming positions other than in accordance with the digits read from each card by the sensing unit, thereby to impose said digits upon the accumulator, switching means to prevent the accumulator from totalizing until the stop means are completely set up with each reading by the sensing device of digit figures to be added from a punched card, and means to clear and recycle the positioning of the stop means, and adding of the digit figures thereby imposed upon the accumulator with each reading of such figures on the cards by the sensing unit.

7. Apparatus for totalizing numerical data stored in a series of punched information storage cards by means of a motor driven accumulator, said accumulator having a series of parallel actuator racks, one for each digit position, which racks project from the accumulator mechanism proportionately to the number set up in the accumulator for the respective digit position represented by each said rack, the positioning of said racks determining the number to be added at each totalizing by the accumulator, and said accumulator being set to urge all said racks to nine digit maximum positions and to repeat the same for addition, said system comprising: a sensing unit for reading the digit figures on the punched cards, stop means to prevent movement of each actuator rack beyond the position that the actuator rack would assume for each different digit capable of being set in the accumulator, said stop means including an elongated extension element for each said rack, said element being disposed in the direction of movement of its rack and being adapted to move therewith, and said stop means further including a plurality of members, one for each of the digit positions 0–8, each of said members being projectable transversely across the path of movement of one of the extension elements to block the passage of said element therebeyond, and a solenoid arrangement for projecting the member for any preselected digit position 0–8, circuit means for momentarily and selectively energizing the solenoids to position the members to prevent the actuator racks from assuming positions other than in accordance with the digits read from each card by the sensing unit, thereby to impose said digits upon the accumulator, switching means to prevent the accumulator from totalizing until the members are completely set up with each reading by the sensing unit of digit figures to be added from a punched card, and means to clear and recycle the positioning of the members, and adding of the digit figures thereby imposed upon the accumulator with each reading of such figures on the cards by the sensing unit.

8. A unit to project selectively through a given plane any one of a plurality of parallel, spaced co-aligned elongated members, each of said members having one of its extremities disposed adjacent said plane and being aligned in a direction transverse to said plane, said device comprising: means for pivoting each of said members in an arc about an axis parallel to said plane, each of said members being slidable in a direction transverse to said plane, a plurality of means, one for each said member, movable in a partially opposed direction to the direction of said arc, in the plane thereof, the last said means including a surface adapted to strike the other extremity of its said member and to permit said extremity to ride up on said surface, thereby to drive said member in the direction of the vector of said arc and said partially opposed direction, through said plane, and means to actuate selectively the combination of said pivoting means and one of said movable means, whereby the combined actuation cause the member to be forced in said vectoral direction through said plane.

9. A unit to project through a given plane, and to hold in such projected position, a preselected one of a plurality of parallel, spaced, co-aligned members, each of said members having one of its extremities adjacent said plane, and one edge, adjacent its other extremity, being serrated, said device comprising: means for pivoting each of said members in an arc about an axis parallel to said plane and directed away from the unserrated edge, each of said member being slidable in a direction transverse to said plane but being spring-biased away from said plane, each said member further being spring-biased in a direction opposed to said arc; a detent bar, said bar being fixedly disposed parallel to said plane and to the alignment of said members so as to be received in the serrations of the latter, a plurality of means, one for each said member, and movable in a partially opposed direction to the direction of said arc, in the plane thereof, the last said means including a surface adapted to strike the other extremity of its said member and to permit said extremity to ride up on said surface, thereby to drive said member in a direction of the vector of said arc and said partially opposed direction, through said given plane, and means for selectively actuating momentarily one of said pivoting means and said movable means, whereby a preselected member is pivoted to move at least one serration of its edge around the detent bar, and in said vectoral direction to pass the other extremity of the member through the given plane, where it is held by the next tooth of the edge serration until released by swinging back of the pivoting means.

10. In combination for performing arithmetic operations on an information storage card having a plurality of fields and having a plurality of columns in each field and having information recorded in the different columns of each field, sensing means responsive to the information in each column on the card for producing signals in accordance with such information, an accounting machine for performing arithmetic operations on the information introduced to the accounting machine, the accounting machine including a carriage movable in increments to different positions, means operatively coupled to the sensing means and to the accounting machine and responsive to the information in each column on the card for obtaining an introduction of such information to the accounting machine, means operatively coupled to the sensing means and to the accounting machine and responsive to the information in each column on the card and responsive to the introduction of such information to the accounting machine for obtaining an advance of the card to the next column, means operatively coupled to the sensing means and to the accounting machine and responsive to the last column of each field on the card for obtaining a transfer into the accounting machine of the information for the different columns in that field, means operatively coupled to the sensing means and to the accounting machine and responsive to the last column of each field on the card for obtaining an incremental movement of the carriage on the accounting machine from one incremental position to the next incremental position, and means operatively coupled to the sensing means and to the accounting machine and responsive to the transfer of information for each particular field into the accounting machine and responsive to the incremental movement of the carriage for initiating the transfer of information into the accounting machine from the first column in the next particular field on the card.

11. Means to project selectively through a given plane any one of a plurality of parallel, spaced, co-aligned elongated members, each of said members having one of its extremities adjacent said plane and being aligned in a direction transverse to said plane, said means comprising: means for pivoting all of said members in an arc about an axis parallel to said plane, said means permitting each of said members to slide in a direction transverse to said plane, and a pluarlity of means, one of each said member, movable in a partially opposed direction to the direction of said arc of swing in the plane thereof, the last said means including a surface adapted to strike the other extremity of each said member, thereby to drive said member in the direction of the vector of said arc and said movement, through said plane.

12. In combination for use with information storage means having successive groups of information recorded on the information storage means: a reading mechanism for sensing the successive groups of information on the information storage means and for producing corresponding groups of output signals representative of such information, a second mechanism constructed to receive the groups of information from the information storage means and to perform arithmetic computations on such information, adapter means coupled to the second mechanism for operating upon the second mechanism to obtain the introduction of information into the second mechanism in accordance with signals introduced to the adapter means from the reading mechanism, means coupled to the reading mechanism and to the adapter means and responsive to the output signals from the reading mechanism for introducing to the adapter means signals representative of each group of information from the information storage means, and means responsive to the introduction of information to the second mechanism from the reading mechanism for each group for obtaining an advance of the reading mechanism to the information in the next group in the information storage means.

13. In combination for use with a plurality of information storage elements having information recorded on each of the elements: a reading mechanism for sensing the information on successive ones of the information storage elements in the plurality and for producing output signals representative of such information, a second mechanism constructed to receive information and to perform arithmetic computations on such information, adapted means coupled to the second mechanism for operating upon the second mechanism to obtain the introduction of information into the second mechanism in accordance with signals introduced to the adapter means, means coupled to the reading mechanism and to the adapted means and responsive to the output signals from the reading mechanism for introducing signals to the adapter means, and means responsive to the introduction of information into the second mechanism from the reading mechanism for each information storage element for obtaining an operation of the reading mechanism to advance the next information storage element to the plurality for the sensing of the information on such next element.

14. The combination set forth in claim 13, including, means responsive to the introduction of information to the second mechanism from a particular number of the information storage elements for operating upon the second mechanism to obtain arithmetic computations on such information.

15. In combination for use with a plurality of information storage cards, each having information recorded on the cards: a card reading mechanism for sensing the information on the information storage cards and for producing output signals representative of such information, a mechanically operable accounting mechanism for performing arithmetic computations on the information introduced to the mechanism, adapter means mechanically coupled to the accounting mechanism for operating upon the accounting mechanism to obtain the introduction of information into the accounting mechanism corresponding to signals introduced to the adapter means, means coupled to the card reading mechanism and to the adapter means and responsive to the output signals from the card reading mechanism for introducing signals to the adapter means in representation of information from successive ones of the information storage cards, and means coupled to the card reading mechanism and to the accounting mechanism and responsive to the introduction to the accounting mechanism of the information of each card for operating upon the reading mechanism to obtain an advance of the next card to the reading mechanism for the sensing of information on such next card.

16. In combination for sensing the information in a plurality of fields on each of a plurality of information storage cards: a card reading mechanism for sensing information sequentially from the fields in the plurality on each of the information storage cards in the plurality and for producing output signals in response to such information, a mechanically operable accounting machine for performing arithmetic operations on information introduced to the accounting machine, adapter means mechanically coupled to the accounting mechanism for operating upon the accounting mechanism to obtain the introduction of information into the accounting mechanism in accordance with signals introduced to the adapter means, means coupled to the card reading mechanism and to the adapter means and responsive to the output signals from the card reading mechanism for introducing signals to the adapter means in representation of the information from the individual fields of the information storage cards in the plurality, means responsive to the information introduced to the accounting mechanism from each of the fields in to each particular information card for obtaining an advance of the card to the next field on the card, and means responsive to the advance of each particular card through the successive fields on the card for operating upon the card reading mechanism to obtain an advance of the next card in the plurality to the card reading mechanism for the sensing of the information on such next card.

17. The combination set forth in claim 16 in which means are responsive to the introduction of information to the accounting mechanism from a particular number of the fields in the cards for obtaining an arithmetic operation on such information by the accounting mechanism.

18. In combination for performing arithmetic operations on an information storage card having a plurality of fields and having a plurality of columns in each field and having information recorded in the different columns of each field,
   sensing means responsive to the information in each column in a first particular one of the fields in the plurality on the information storage card for sensing the information in that column on such card and for producing signals in accordance with the information sensed in that column,
   an accounting machine for performing arithmetic operations on the information introduced to the accounting machine, the accounting machine including a movable carriage for controlling the operations of the accounting machine in accordance with the movements of the carriage and further including stop means for controlling the movements of the carriage in accordance with the disposition of the stop means relative to the carriage,
   first means operatively coupled to the sensing means and responsive to the signals representing the information stored in each column in the first particular field for introducing such information to the accounting machine and for obtaining an advance of the carriage on the accounting machine in accordance with the disposition of the stop means,
   second means responsive to the introduction to the accounting machine of the information in each column in the first particular field for obtaining the advance of the card to the next column in the first particular field, and
   means operatively coupled to the sensing means and to the accounting machine and responsive to the introduction to the accounting machine of the information in the different columns in the first particular field for obtaining the transfer of such information into the accounting machine for the performance of arithmetical operations by the accounting machine on such information in accordance with the advances of the carriage.

19. In combination for performing arithmetical operations on an information storage card having a plurality of fields and having a plurality of columns in each field and having information recorded in the different columns of each field,
   sensing means responsive to the information in each column in a first particular one of the fields in the plurality for producing signals representative of the information in that column,
   an accounting machine for performing arithmetic operations on the information introduced into the accounting machine,
   control means normally disposed in a neutral disposition and movable to positions displaced from such neutral position, the control means being responsive to the signals from the sensing means to become moved into an individual disposition representative of such signals, the control means being coupled to the accounting machine for obtaining the introduction into the accounting machine of information related to the individual disposition of the control means,
   means responsive to the end of each field on the card for obtaining an arithmetical operation by the accounting machine of such information, and
   means responsive to the end of each field on the card for obtaining a return of the control means to the neutral disposition.

20. In combination for performing arithmetic operations on an information storage card having a plurality of fields and having a plurality of columns in each field and having information recorded in the different columns of each field,
   sensing means responsive to the information in each column in a first particular one of the fields in the plurality on the card for producing signals having characteristics representing the information in that column on the card,
   actuating means operatively coupled to the sensing means and responsive to the signals from the sensing means for each column in the first particular field on the card to become disposed at different positions in accordance with the characteristics of such signals,
   an accounting machine constructed to provide an arithmetical operation on the information introduced into the accounting machine,
   means responsive to particular information in representation of the last column of the first particular field on the card for obtaining the transfer of information into the accounting machine in accordance with the disposition of the actuating means, and
   means responsive to the particular information in representation of the last column of the first particular field on the card for obtaining the return of the actuating means to a neutral position for displacement of such actuating means in accordance with the information in the different columns in the next field on the card.

21. In combination for performing arithmetical operations on an information storage card having a plurality of fields and having a plurality of columns in each field and having information recorded in the different columns of each field,
   sensing means responsive to the information in each column on a first particular one of the fields in the plurality to produce signals in accordance with such information,
   an accounting machine constructed to perform arithmetical operations on the information introduced to the accounting machine,
   a plurality of control means each operatively coupled to the sensing means and responsive to the signals from the sensing means to become disposed at different positions relative to a particular position in representation of the information indicated by the signals and each constructed to become reset to the particular position upon the introduction into the accounting machine of information represented by the setting of the control means, means operatively coupled to the control means and responsive to the disposition of each individual control means in the plurality to the different positions in representation of the information in each column in the first particular field on the card for obtaining an advance of the card relative to the sensing means to the next column in the first particular field on the card, means operatively coupled to the control means and to the accounting machine and responsive to the last column in the first particular field on the card for obtaining an introduction into the accounting machine of information in accordance with the disposition of the different control means in the plurality at the different positions and for obtaining the introduction of such information into the accounting machine for the performance of arithmetical operations on such information, and means responsive to the last column in the first particular field on the card for obtaining a resetting of the control means to the particular position to prepare the control means to become set in accordance with the information in the next particular field on the card.

22. The combination set forth in claim 12 wherein the second mechanism is provided with a movable carriage and with stop means controlling the movement of the carriage and with a plurality of actuator means each movable to different positions representing individual information and wherein the adaptor means include a plurality of members movable in accordance with the output signals from the reading mechanism and operatively coupled to the actuator means to provide individual movements of the actuator means in accordance with the movements of the members in the adaptor means.

23. The combination set forth in claim 13 wherein the second mechanism is provided with a movable carriage and with stop means controlling the movements of the carriage and controlling the arithmetic operations performed by the second means in accordance with the successive movements of the carriage and wherein the second mechanism is also provided with a plurality of actuator means each movable to different positions representing individual information and wherein the adaptor means include a plurality of members movable in accordance with the output signals from the reading mechanism and operatively coupled to the actuator means in the plurality to provide individual movements of the actuator means in accordance with the movements of the members in the adaptor means.

24. The combination set forth in claim 16 wherein the mechanically operable accounting machine includes a movable carriage and stop means controlling the movement of the carriage and controlling the arithmetic operations performed by the accounting machine in accordance with the successive movements of the carriage, and wherein the accounting machine also includes a plurality of actuator means each movable to different positions representing individual information, and wherein the adaptor means include a plurality of members movable in accordance with the output signals from the card reading mechanism and operatively coupled to the actuator means in the plurality to provide individual movements of the actuator means in accordance with the movements of the members in the adaptor means.

25. The combination set forth in claim 18, including, means operatively coupled to the sensing means and to the accounting machine and responsive to the introduction to the accounting machine of the information from the different columns in each field on the card for obtaining an advance of the card to the next field on the card.

26. The combination set forth in claim 19, including, means responsive to the introduction to the accounting machine of the information in each column on the card for obtaining an advance of the card to the next column on the card for the sensing of the information in such next column by the sensing means.

27. The combination set forth in claim 20, including, means operatively coupled to the sensing means and to the accounting machine and responsive to the transfer to the sensing means of the information in the different columns for each field on the card for obtaining an advance of the card to the next field for the sensing by the sensing means of the information in the different columns of such next field.

28. The combination set forth in claim 21, including, means operatively coupled to the accounting machine and to the sensing means and responsive to the introduction to the accounting machine of the information for the different columns in each particular field on the card for obtaining an advance of the card to the next field for the sensing of such information in the next field by the accounting machine, and means operatively coupled to the accounting machine and responsive to the introduction to the accounting machine of the information in a particular number of the fields on the card for operating upon the accounting machine to obtain arithmetic computations on such information by the accounting machine.

29. In combination for performing arithmetic operations on an information storage card having a plurality of fields and having a plurality of columns in each field and having information recorded in the different columns of each field, sensing means responsive to the information in each column on the card for producing signals in accordance with such information, an accounting machine constructed to perform arithmetic operations on the information introduced to the accounting machine and including a carriage laterally displaceable in successive increments from an initial position, first control means operatively coupled to the sensing means and to the accounting machine and responsive to the signals representing the information in the different columns of each particular field on the card and responsive to the end of each such particular field for obtaining a transfer into the accounting machine of information related to the information in the different columns of the particular field, second control means operatively coupled to the sensing means and to the accounting machine and responsive to the transfer of information to the accounting machine in the different columns of the particular field for obtaining an incremental displacement of the carriage to prepare the accounting machine for the performance of the arithmetical operations, means operatively coupled to the sensing means and to the accounting machine and responsive to the transfer to the accounting machine of the information for the different columns in each particular field for obtaining an advance of the card to the different columns of the next field on the card for the sensing of the information in the different columns of such next field by the sensing means, and means operatively coupled to the accounting machine and responsive to the transfer of the information in the last field on the card to the accounting machine for obtaining a return of the carriage to its initial position.

30. The combination set forth in claim 10, including, means operatively coupled to the sensing means and to the accounting machine and responsive to the transfer of the information to the accounting machine of the information in the columns on a particular number of fields for operating upon the accounting machine to obtain an arithmetic computation of such information by the accounting machine.

31. In combination for performing arithmetic operations on an information storage card having a plurality of fields and having a plurality of columns in each field and having information recorded in the different columns of each field, sensing means responsive to the information in each column on the card for producing signals in accordance with such information, an accounting machine for performing arithmetic operations on the information introduced to the accounting machine, the accounting machine including a carriage movable from an initial position and including stops for controlling the successive movements of the carriage from the initial position, control means operatively coupled to the sensing means and to the accounting machine and responsive to the signals from the sensing means for receiving information represented by the signals from the sensing means, means operatively coupled to the control means and responsive to the reception of information by the sensing means for each column in each particular field on the card for obtaining an advance of the card to the next column in that particular field on the card, means operatively coupled to the control means and the accounting machine and responsive to the end of each particular field for obtaining a transfer into the accounting machine of the information received by the control means for the different columns in that particular field, and means operatively coupled to the sensing means and to the accounting machine and responsive to the transfer of information to the accounting machine for the different columns in each particular field on the card to obtain an advance of the card from that particular field to the next particular field on the card for the sensing of information by the sensing means in the different columns of such next particular field.

32. The combination set forth in claim 31, including, means operatively coupled to the sensing means and to the accounting machine and responsive to the transfer into the accounting machine of the information in the different columns for a particular number of fields on the card for operating upon the accounting machine to obtain an arithmetic computation of such information by the accounting machine.

33. In combination for use with recording means for processing data on an information card having a plurality of fields and having a plurality of columns in each field and for use with an accounting machine constructed to perform arithmetic operations on a digital basis and to produce output indications as to the digital results of such arithmetic operations and constructed to store information in a plurality of movable members in accordance with the movement of the member, control means for indicating a plurality of fields and for indicating a plurality of columns in each field where the number of columns in each field may be different from the number of columns in the other fields in the plurality, a plurality of actuatable means operatively coupled to the control means and to the recording means and responsive to the information processed by the recording means in each column in each field to become individually positioned in accordance with such information, means operatively coupled to the actuatable means and to the accounting machine and responsive to the individual positioning of the actuatable means for the different columns in each particular field for obtaining a positioning of the movable members in the accounting machine in accordance with the individual positioning of the actuatable means, means responsive to the transfer to the movable members in the accounting machine of the information for the columns in each particular field on the card to obtain an advance of the card to the next field for the processing of the information in the next field by the recording means, and cyclic means responsive to the disposition of the movable members in the accounting machine in accordance with the information from the accounting machine for freeing the accounting machine for the reception of additional information from the recording means.

34. The combination set forth in claim 33, including, means responsive to the introduction to the movable members in the accounting machine of the information in the columns for a particular number of fields for obtaining an arithmetic combination of such information to provide a desired result.

References Cited in the file of this patent

UNITED STATES PATENTS

| | | |
|---|---|---|
| 1,307,683 | Lasker | June 24, 1919 |
| 1,926,203 | Lasker | Sept. 12, 1933 |
| 2,536,837 | Carey et al. | Jan. 2, 1951 |
| 2,746,679 | Stratton et al. | May 22, 1956 |
| 2,764,345 | Mixer | Sept. 25, 1956 |
| 2,767,907 | Schwend | Oct. 23, 1956 |
| 2,772,048 | Collison et al. | Nov. 27, 1956 |
| 2,902,214 | Donan et al. | Sept. 1, 1959 |
| 3,012,717 | Sobisch | Oct. 12, 1961 |
| 3,049,291 | Greenhalgh et al. | Aug. 14, 1962 |